US012812692B2

(12) United States Patent
Go et al.

(10) Patent No.: US 12,812,692 B2
(45) Date of Patent: Nov. 24, 2026

(54) METHOD AND DEVICE FOR AND RECEIVING RAR

(71) Applicant: LG Electronics Inc., Seoul (KR)

(72) Inventors: Seongwon Go, Seoul (KR); Youngdae Lee, Seoul (KR); Suckchel Yang, Seoul (KR); Jiwon Kang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/724,950

(22) PCT Filed: Apr. 3, 2024

(86) PCT No.: PCT/KR2024/004300
§ 371 (c)(1),
(2) Date: Jun. 27, 2024

(87) PCT Pub. No.: WO2024/210493
PCT Pub. Date: Oct. 10, 2024

(65) Prior Publication Data

US 2026/0164469 A1 Jun. 11, 2026

Related U.S. Application Data

(60) Provisional application No. 63/457,786, filed on Apr. 6, 2023.

(51) Int. Cl.
*H04W 74/0833* (2024.01)
*H04B 7/06* (2006.01)
*H04W 72/23* (2023.01)

(52) U.S. Cl.
CPC .... *H04W 74/0833* (2013.01); *H04B 7/06968* (2023.05); *H04W 72/23* (2023.01)

(58) Field of Classification Search
None
See application file for complete search history.

(56) References Cited

U.S. PATENT DOCUMENTS

| | | | | |
|---|---|---|---|---|
| 11,265,921 | B2 * | 3/2022 | Tie | H04B 7/06968 |
| 2020/0112984 | A1 * | 4/2020 | Islam | H04L 5/001 |
| 2020/0196383 | A1 * | 6/2020 | Tsai | H04B 7/06952 |
| 2021/0037575 | A1 * | 2/2021 | Ohara | H04L 5/0053 |
| 2022/0322423 | A1 * | 10/2022 | Khoshnevisan | H04L 1/08 |
| 2022/0377799 | A1 | 11/2022 | MolavianJazi et al. | |

(Continued)

OTHER PUBLICATIONS

Ericsson, "Moderator Summary #2 on Two Tas for multi-DCI," R1-2210468, 3GPP TSG-RAN WG1, Meeting #110bis-e, e-Meeting, Oct. 10-19, 2022, 55 pages.

(Continued)

*Primary Examiner* — Lonnie V Sweet
(74) *Attorney, Agent, or Firm* — Fish & Richardson P.C.

(57) ABSTRACT

A method according to an embodiment of the present disclosure comprises receiving a PDCCH order, transmitting a PRACH, receiving a PDCCH related to a RAR, and receiving a PDSCHd to the RAR. Based on a CORESET related to the PDCCH order being related to a second physical cell ID different from a first physical cell ID: the PDCCH and the PDSCH are received based on QCL properties. The QCL properties are based on a CORESET related to a Type 1-PDCCH CSS set.

12 Claims, 5 Drawing Sheets

(56) References Cited

U.S. PATENT DOCUMENTS

| | | | | |
|---|---|---|---|---|
| 2023/0107490 | A1 * | 4/2023 | Abdelghaffar | H04L 5/0035 370/329 |
| 2023/0224916 | A1 * | 7/2023 | Cirik | H04W 74/08 370/329 |
| 2025/0063604 | A1 * | 2/2025 | Matsumura | H04W 88/02 |
| 2025/0176029 | A1 * | 5/2025 | Guo | H04B 7/024 |
| 2026/0006650 | A1 * | 1/2026 | Shibaike | H04W 8/22 |
| 2026/0020073 | A1 * | 1/2026 | Guo | H04W 56/0045 |

OTHER PUBLICATIONS

International Search Report and Written Opinion in International Appln. No. PCT/KR2024/004300, mailed on Jul. 31, 2024, 11 pages (with partial English translation).

NTT Docomo, Inc., "CR on QCL assumption for receiving PDCCH for RAR," R1-1902780, 3GPP TSG RAN WG1, Meeting #96, Athens, Greece, Feb. 25-Mar. 1, 2019, 4 pages.

Xiaomi, "Discussion on two TAs for multi-TRP operation," R1-2300546, 3GPP TSG RAN WG1, #112, Athens, Greece, Feb. 27-Mar. 3, 2023, 8 pages.

ZTE, "Remaining details of RACH procedure," R1-1805945, 3GPP TSG RAN WG1, Meeting #93, Busan, Korea, May 21-25, 2018, 15, pages.

* cited by examiner

METHOD AND DEVICE FOR AND RECEIVING RAR

CROSS-REFERENCE TO RELATED APPLICATIONS

This application is a National Stage application under 35 U.S.C. § 371 of International Application No. PCT/KR2024/004300, filed on Apr. 3, 2024, which claims the benefit of U.S. Patent Application No. 63/457,786, filed on Apr. 6, 2023. The contents of the prior applications are incorporated by reference herein in their entirety.

TECHNICAL FIELD

The present disclosure relates to a method and device for transmitting and receiving an RAR.

BACKGROUND

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

If a random access procedure is initiated by PDCCH order and PRACH is transmitted, the following Quasi Co-Location (QCL) properties are assumed for PDCCH/PDSCH related to a random access response (RAR).

Specifically, the PDCCH/PDSCH and the PDCCH order have the same QCL properties. More specifically, DMRS ports of the PDSCH and DMRS ports of the PDCCH order are assumed to be quasi co-located (QCLed) for the same SS/PBCH block or CSI-RS resource. The "same SS/PBCH block or CSI-RS resource" may be used for PRACH association. The above-described example may be applied for SpCell.

In this instance, if a COntrol REsource SET (CORESET) related to the PDCCH order is related to a different cell (second cell) from a serving cell, it may not be suitable to apply for QCL properties related to reception of the RAR (PDCCH/PDSCH). Specifically, the following ambiguity exists.

The PRACH has been transmitted for the second cell, but the RAR may be received from the serving cell. In such a case, the QCL properties related to the PDCCH order will be suitable for reception from the second cell, but the existing defined QCL properties for RAR (PDCCH/PDSCH) may not be suitable for the RAR (PDCCH/PDSCH) reception from the serving cell. The second cell may be i) a candidate cell related to L1/L2-triggered mobility or ii) an additional PCI related to a CORESET pool index different from the serving cell.

SUMMARY

As described above, if PDCCH order/PRACH is related to a different cell from a serving cell and an RAR is received from the serving cell, the existing defined QCL properties may not be suitable for reception of the RAR.

The present disclosure provides a method to solve the above-mentioned problems.

The technical objects of the present disclosure are not limited to the aforementioned technical objects, and other technical objects, which are not mentioned above, will be apparently appreciated by a person having ordinary skill in the art from the following description.

A method performed by a user equipment (UE) in a wireless communication system according to an embodiment of the present disclosure comprises receiving a Physical Downlink Control CHannel (PDCCH) order related to an initiation of a random access procedure, transmitting a Physical Random Access Channel (PRACH), receiving a Physical Downlink Control CHannel (PDCCH) related to a Random Access Response (RAR), and receiving a Physical Downlink Shared CHannel (PDSCH) related to the RAR.

Based on a COntrol REsource SET (CORESET) related to the PDCCH order being related to a second physical cell ID different from a first physical cell ID: the PDCCH and the PDSCH are received based on Quasi Co-Location (QCL) properties.

The QCL properties are based on a CORESET related to a Type 1-PDCCH Common Search Space (CSS) set.

DeModulation Reference Signal (DMRS) ports related to the PDSCH, with respect to the QCL properties, may be quasi co-located (QCLed) with a DMRS port for a PDCCH reception in the CORESET related to the Type 1-PDCCH CSS set.

The QCL properties may include at least one of a Doppler shift, a Doppler spread, an average delay, a delay spread and/or a spatial Rx parameter.

The first physical cell ID and the second physical cell ID may be related to different CORESET pool indices.

The first physical cell ID may be based on a Physical Cell Identity (PCI) of a serving cell, and the second physical cell ID may be based on an additional PCI.

The first physical cell ID may be related to a first Timing Advance Group (TAG). The second physical cell ID may be related to a second TAG.

The method may further comprise receiving a configuration for a Synchronization Signal Block (SSB) related to the additional PCI.

The additional PCI may be indicated based on the PDCCH order.

The method may further comprise receiving a Random Access CHannel (RACH) configuration related to the additional PCI.

The random access procedure may be related to a Special Cell (SpCell) in which two Timing Advance Groups (TAGs) are configured.

The Type 1-PDCCH CSS set may be related to the serving cell.

A user equipment (UE) according to another embodiment of the present disclosure comprises one or more transceivers, one or more processors, and one or more memories that are connected to the one or more processors and store instructions.

The instructions, based on being executed by the one or more processors, configure the one or more processors to perform all steps of any one of the methods.

A device according to another embodiment of the present disclosure comprises one or more memories and one or more processors operably connected to the one or more memories.

The one or more memories are configured to store instructions based on being executed by the one or more processors. The instructions configure the one or more processors to perform all steps of any one of the methods.

One or more non-transitory computer readable mediums according to another embodiment of the present disclosure store instructions. The instructions executable by one or more processors configure the one or more processors to perform all steps of any one of the methods.

A method performed by a base station in a wireless communication system according to another embodiment of the present disclosure comprises transmitting a Physical Downlink Control CHannel (PDCCH) order related to an initiation of a random access procedure, receiving a Physical Random Access Channel (PRACH), transmitting a Physical Downlink Control CHannel (PDCCH) related to a Random Access Response (RAR), and transmitting a Physical Downlink Shared CHannel (PDSCH) related to the RAR.

Based on a COntrol REsource SET (CORESET) related to the PDCCH order being related to a second physical cell ID different from a first physical cell ID: the PDCCH and the PDSCH are transmitted based on Quasi Co-Location (QCL) properties.

The QCL properties are based on a CORESET related to a Type 1-PDCCH Common Search Space (CSS) set.

A base station according to another embodiment of the present disclosure comprises one or more transceivers, one or more processors, and one or more memories that are connected to the one or more processors and store instructions.

The instructions, based on being executed by the one or more processors, configure the one or more processors to perform all steps of the method.

When a cell (e.g., additional PCI or candidate cell) related to PDCCH order transmission is different from a cell (e.g., PCI of a serving cell) related to RAR transmission, if the existing defined QCL properties (e.g., QCL properties related to PDCCH order) are applied as it is, an RAR may not be received properly. According to embodiments of the present disclosure, based on a CORESET related to PDCCH order being related to a second physical cell ID different from a first physical cell ID, PDCCH and PDSCH related to the RAR are received based on QCL properties (QCL properties based on CORESET related to Type1-PDCCH CSS set). Accordingly, if the cell related to the PDCCH order transmission is different from the cell related to the RAR transmission in a random access procedure, more suitable QCL properties can be utilized for reception of the RAR.

Further, since PRACH retransmission and/or RAR retransmission can be prevented due to RAR reception failure, a random access procedure performed based on PCI (e.g., additional PCI or PCI of candidate cell) of a non-serving cell can be improved in terms of signaling overhead and latency.

In addition, since a probability of successful RAR reception can be increased, a delay can be minimized until the random access procedure based on the PCI of the non-serving cell is completed and a subsequent procedure is performed. For example, a time at which i) an LTM cell switch related procedure or ii) an UL transmission operation based on TA obtained through a random access procedure can be performed can be advanced.

Effects which may be obtained by the present disclosure are not limited to the aforementioned effects, and other technical effects not described above may be evidently understood by a person having ordinary skill in the art to which the present disclosure pertains from the following description.

DETAILED DESCRIPTION

Figure 1:
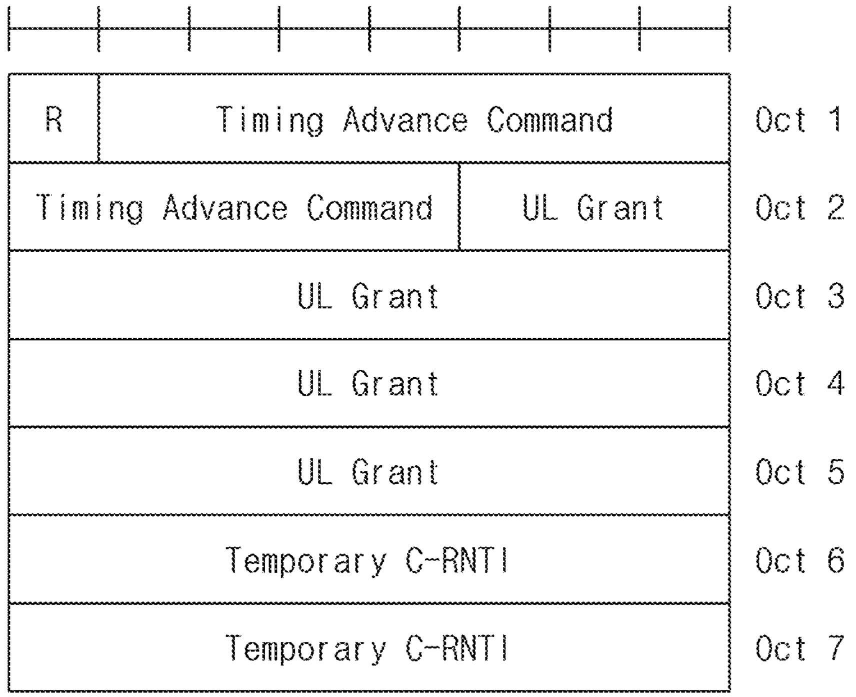
FIG. 1 illustrates MAC RAR according to an embodiment of the present disclosure.

Hereinafter, preferred embodiments of the disclosure are described in detail with reference to the accompanying drawings. The following detailed description taken in conjunction with the accompanying drawings is intended for describing embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

Timing Advance (TA) Related Procedure

Uplink frame number i for transmission from a user equipment (UE) shall start $T_{TA}$ before the start of the corresponding downlink frame at the UE.

Uplink timing (e.g., uplink frame) related to $T_{TA}$ may be based on Table 1 below.

TABLE 1

| |
|---|
| Uplink frame number i for transmission from the UE shall start $T_{TA} = (N_{TA} + N_{TA,offset} + N_{TA,adj}^{common} + N_{TA,adj}^{UE})T_c$ before the start of the corresponding downlink frame at the *UE* where |
| $N_{TA}$ and $N_{TA,offset}$ are given by clause 4.2 of [5, TS 38.213], except for msgA transmission on PUSCH where $N_{TA} = 0$ shall be used; |
| $N_{TA,adj}^{common}$ given by clause 4.2 of [5, *TS* 38.213] is derived from the higher-layer parameters TACommon, TACommonDrift, and TACommonDriftVariation if configured, otherwise $N_{TA,adj}^{common} = 0$, |
| $N_{TA,adj}^{UE}$ given by clause 4.2 of [5, *TS* 38.213] is computed by the *UE* based on *UE* position and serving-satellite-ephemeris-related higher-layers parameters if configured, otherwise $N_{TA,adj}^{UE} = 0$ |

In Table 1, $T_{TA}$ may be calculated/determined based on $N_{TA}$ and $N_{TAoffset}$. $N_{TA}$ and $N_{TA,offset}$ may be configured/applied as follows.

$N_{TA}$: 1) configuring through a random access response (RAR) and 2) configuring through timing advance command (MAC-CE)

$N_{TA,offset}$: 1) configuring a specific value per serving cell and 2) applying a pre-defined value based on duplex mode/FR suitably to the serving cell A method of configuring/applying $N_{TA,offset}$ and $N_{TA}$ described above is described in detail below.

$N_{TA,offset}$

Case 1) Method of Configuring a Specific Value Per Serving Cell

For example, a UE may receive configuration information (e.g., ServingCellConfigCommon Information) including information on $N_{TA,offset}$ from a base station. The configuration information may be received based on RRC signaling. Table 2 below shows the configuration information.

TABLE 2

- ServingCellConfigCommon

The IE ServingCellConfigCommon is used to configure cell specific parameters of a UE's serving cell. The IE contains parameters which a UE would typically acquire from SSB, MIB or SIBs when accessing the cell from IDLE. With this IE, the network provides this information in dedicated signalling when configuring a UE with a SCells or with an additional cell group (SCG). It also provides it for SpCells (MCG and SCG) upon reconfiguration with sync.

ServingCellConfig Common information element

```
-- ASN1START
-- TAG-SERVINGCELLCONFIGCOMMON-START
ServingCellConfigCommon ::=          SEQUENCE {
  physCellId                                              PhysCellId
OPTIONAL,   -- Cond HOAndServCellAdd,
  downlinkConfigCommon                                    DownlinkConfigCommon
OPTIONAL,   -- Cond HOAndServCellAdd
  uplinkConfigCommon                                      UplinkConfigCommon
OPTIONAL,   -- Need M
  supplementaryUplinkConfig                               UplinkConfigCommon
OPTIONAL,   -- Need S
  n-TimingAdvanceOffset                     ENUMERATED { n0, n25600, n39936 }
OPTIONAL,   -- Need S
                                  (...)
}
-- TAG-SERVINGCELLCONFIGCOMMON-STOP
-- ASN1STOP
```

n-TimingAdvanceOffset

The N_TA-Offset to be applied for all uplink transmissions on this serving cell. If the field is absent, the UE applies the value defined for the duplex mode and frequency range of this serving cell. See TS 38.133 [14], table 7.1.2-2.

Case 2) Method of Applying a Pre-Defined Value Based on Duplex Mode/FR Suitably to Serving Cell For example, the UE may apply a pre-defined value of $N_{TA,offset}$ based on duplex mode (TDD/FDD)/FR suitably to the serving cell. Table 3 below shows the value of $N_{TA,offset}$.

TABLE 3

TABLE 7.1.2-2: The Value of $N_{TA\ offset}$

| Frequency range and band of cell used for uplink transmission | $N_{TA\ offset}$ (Unit: $T_c$) |
|---|---|
| FR1 FDD or TDD band with neither E-UTRA-NR nor NB-IoT-NR coexistence case | 25600 (Note 1) |
| FR1 FDD band with E-UTRA-NR and/or NB-IoT-NR coexistence case | 0 (Note 1) |
| FR1 TDD band with E-UTRA-NR and/or NB-IoT-NR coexistence case | 39936 (Note 1) |
| FR2 | 13792 |

[1] Note 1:
The UE identifies $N_{TA\ offset}$ based on the information n-TimingAdvanceOffset as specified in TS 38.331 [2]. If UE is not provided with the information n-TimingAdvanceOffset, the default value of $N_{TA\ offset}$ is set as 25600 for FR1 band. In case of multiple UL carriers in the same TAG, UE expects that the same value of n-TimingAdvanceOffset is provided for all the UL carriers according to clause 4.2 in TS 38.213 [3] and the value 39936 of $N_{TA\ offset}$ can also be provided for a FDD serving cell.
[2] Note 2:
Void $N_{TA}$ Case 1) Method of Configuring Through a Random Access Response (RAR)

For example, in a random access procedure (e.g., 2-step RACH procedure or 4-step RACH procedure), a UE may receive an RAR from a base station. $N_{TA}$ may be determined/configured based on the RAR. Specifically, the RAR may include a timing advance command. The timing advance command indicates an index value (e.g., index value TA) related to timing adjustment. $N_{TA}$ may be determined based on the index value (see Table 4 below). The RAR may be based on MAC RAR. This is described below with reference to FIG. 1.

FIG. 1 illustrates MAC RAR according to an embodiment of the present disclosure.

Referring to FIG. 1, MAC RAR may include Reserved bit (R), Timing Advance Command, UL Grant, and Temporary C-RNTI. Table 4 below shows MAC payload of the MAC RAR.

TABLE 4

Figure 6:
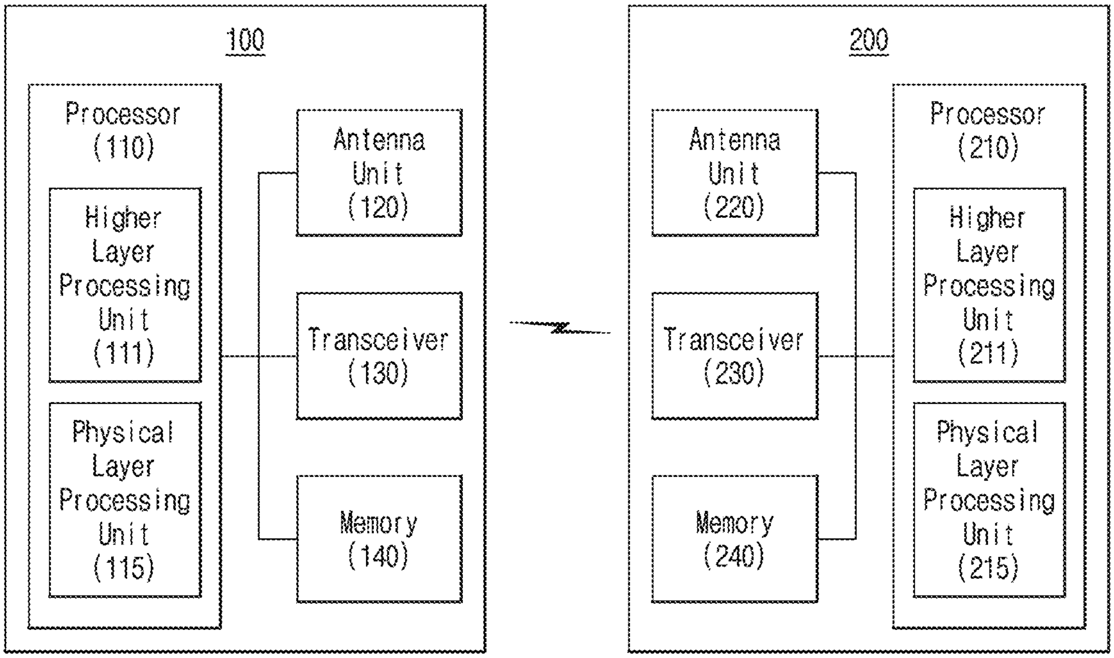
FIG. 6 illustrates configuration of a first device and a second device according to an embodiment of the present disclosure.

| 6.2.3 MAC payload for Random Access Response |
|---|
| The MAC RAR is of fixed size as depicted in FIG. 6.2.3-1, and consists of the following fields:<br>- R: Reserved bit, set to 0;<br>- TI: If two TAGs are configured for the Serving Cell in which the Random Access procedure is being performed, this field indicates one of the two TAGs to which the Timing Advance Command is applied. The field set to 0 indicates the first TAG ID and the field set to 1 indicates the second TAG ID. If two TAGs are not configured for the Serving Cell in which the Random Access procedure is being performed, the R bit is present instead;<br>- Timing Advance Command: The Timing Advance Command field indicates the index value $T_A$ used to control the amount of timing adjustment that the MAC entity has to apply in TS 38.213 [6]. The size of the Timing Advance Command field is 12 bits;<br>- UL Grant: The Uplink Grant field indicates the resources to be used on the uplink in TS 38.213 [6]. The size of the UL Grant field is 27 bits;<br>- Temporary C-RNTI: The Temporary C-RNTI field indicates the temporary identity that is used by the MAC entity during Random Access. The size of the Temporary C-RNTI field is 16 bits.<br>The MAC RAR is octet aligned. |

Table 5 below shows transmission timing adjustments based on the timing advance command.

TABLE 5

| 4.2 Transmission timing adjustments |
|---|
| A UE can be provided a value $N_{TA,offset}$ of a timing advance offset for a serving cell by n-TimingAdvanceOffset for the serving cell. If for a serving cell the UE is provided two coresetPoolIndex values 0 and 1 for first and second CORESETs, or is not provided coresetPoolIndex value for first CORESETs and is provided coresetPoolIndex value of 1 for second CORESETs, the UE can be provided first and second $N_{TA,offset}$ values by n-TimingAdvanceOffset and n-TimingAdvanceOffset2 for transmissions with TCI states associated with the first and second CORESETs, respectively. A UE can be provided a second $N_{TA,offset}$ value for transmissions with spatial domain filters corresponding to TCI states associated with physCellId different from physCellId for the serving cell in addition to a first $N_{TA,offset}$ value for transmissions with spatial domain filters corresponding to TCI states associated with physCellId for the serving cell. The first and second $N_{TA,offset}$ values correspond to first and second TAGs [11, TS 38.321] having an association indicated by tag-Id-ptr with first and second joint TCI states provided by dl-OrJointTCI-StateList or first and second UL TCI states provided by ul-TCI-State-List. If the UE is not provided n-TimingAdvanceOffset for a serving cell, the UE determines a default value $N_{TA,offset}$ of the timing advance offset for the serving cell as described in [10, TS 38.133].<br>If a UE is configured with two UL carriers for a serving cell, a same timing advance offset value $N_{TA,offset}$ applies to both carriers for transmissions on the serving cell that are associated with a same TAG. The UE does not expect to apply two $N_{TA,offset}$ values for transmissions on the SUL carrier.<br>Upon reception of a timing advance command for a TAG, the UE adjusts uplink timing for |

TABLE 5-continued

| 4.2 Transmission timing adjustments |
|---|
| PUSCH/SRS/PUCCH transmission on all the serving cells in the TAG based on a value $N_{TA,offset}$ that the UE expects to be same for all the serving cells in the TAG and based on the received timing advance command where the uplink timing for PUSCH/SRS/PUCCH transmissions is the same for all the serving cells in the TAG. |
| For a band with synchronous contiguous intra-band EN-DC in a band combination with non-applicable maximum transmit timing difference requirements as described in Note 1 of Table 7.5.3-1 of [10, TS 38.133], if the UE indicates ul-TimingAlignmentEUTRA-NR as 'required' and uplink transmission timing based on timing adjustment indication for a TAG from MCG and a TAG from SCG are determined to be different by the UE, the UE adjusts the transmission timing for PUSCH/SRS/PUCCH transmission on all serving cells part of the band with the synchronous contiguous intra-band EN-DC based on timing adjustment indication for a TAG from a serving cell in MCG in the band. The UE is not expected to transmit a PUSCH/SRS/PUCCH in one CG when the PUSCH/SRS/PUCCH is overlapping in time, even partially, with random access preamble transmitted in another CG. |
| For a SCS of $2^{\mu}$ . 15 kHz, the timing advance command for a TAG indicates the change of the uplink timing relative to the current uplink timing for the TAG in multiples of $16 \cdot 64 \cdot T_c/2^{\mu}$. The start timing of the random access preamble is described in [4, TS 38.211]. |
| A timing advance command [11, TS 38.321] in case of random access response or in an absolute timing advance command MAC CE or in a cell switch command, $T_A$, for a TAG indicates $N_{TA}$ values by index values of $T_A = 0, 1, 2, \ldots, 3846$, where an amount of the time alignment for the TAG with SCS of $2^{\mu} \cdot 15$ KHz is $N_{TA} = T_A \cdot 16 \cdot 64/2^{\mu}$. $N_{TA}$ is defined in [4, TS 38.211] and is relative to the SCS of the first uplink transmission from the UE after the reception of the random access response or absolute timing advance command MAC CE or the cell switch command. |
| In other cases, a timing advance command [11, TS 38.321], $T_A$, for a TAG indicates adjustment of a current $N_{TA}$ value, $N_{TA,old}$, to the new $N_{TA}$ value, $N_{TA,new}$, by index values of $T_A = 0, 1, 2, \ldots, 63$, where for a SCS of $2^{\mu}$. 15 KHz, $N_{TA,new} = N_{TA,old} + (T_A - 31) \cdot 16 \cdot 64/2^{\mu}$. |
| If a UE has multiple active UL BWPs, as described in clause 12, in a same TAG, including UL BWPs in two UL carriers of a serving cell, the timing advance command value is relative to the largest SCS of the multiple active UL BWPs. The applicable $N_{TA,new}$ value for an UL BWP with lower SCS may be rounded to align with the timing advance granularity for the UL BWP with the lower SCS while satisfying the timing advance accuracy requirements in [10, TS 38.133]. |
| Adjustment of an $N_{TA}$ value by a positive or a negative amount indicates advancing or delaying the uplink transmission timing for the TAG by a corresponding amount, respectively. |
| For a timing advance command received on uplink slot n and for a transmission other than a PUSCH scheduled by a RAR UL grant or a fallbackRAR UL grant as described in clause 8.2A or 8.3, or a PUCCH with HARQ-ACK information in response to a successRAR as described in clause 8.2A, the corresponding adjustment of the uplink transmission timing applies from the beginning of uplink slot $n + k + 1 + 2^{\mu} \cdot K_{offset}$ where $k = \lceil N_{slot}^{subframe,\mu} \cdot (N_{T,1} + N_{T,2} + N_{TA,max} + 0.5)/T_{sf} \rceil$, |
| $N_{T,1}$ is a time duration in msec of $N_1$ symbols corresponding to a PDSCH processing time for UE processing capability 1 when additional PDSCH DM-RS is configured, $N_{T,2}$ is a time duration in msec of $N_2$ symbols corresponding to a PUSCH preparation time for UE processing capability 1 [6, TS 38.214], $N_{TA,max}$ is the maximum timing advance value in msec that can be provided by a *TA* command field of 12 bits, $N_{slot}^{subframe,\mu}$ is the number of slots per subframe, $T_{sf}$ is the subframe duration of 1 msec, and $K_{offset} = K_{cell,offset} - K_{UE,offset}$, where $K_{cell,offset}$ is provided by cellSpecificKoffset and $K_{UE,offset}$ is provided by a Differential Koffset MAC CE command [11, TS 38.321]; otherwise, if not respectively provided, $K_{cell,offset} = 0$ or $K_{UE,offset} = 0$. $N_1$ and $N_2$ are determined with respect to the minimum SCS among the SCSs of all configured UL BWPs for all uplink carriers in the TAG and of all configured DL BWPs for the corresponding downlink carriers. |
| For $\mu = 0$, the *UE* assumes $N_{1,0} = 14$ [6, *TS* 38.214]. Slot *n* and $N_{slot}^{subframe,\mu}$ are determined with respect to the minimum SCS among the SCSs of all configured UL BWPs for all uplink carriers in the TAG. $N_{TA,max}$ is determined with respect to the minimum SCS among the SCSs of all configured UL BWPs for all uplink carriers in the TAG and for all configured initial UL BWPs provided by initialUplinkBWP. The uplink slot n is the last slot among uplink slot(s) overlapping with the slot(s) of PDSCH reception assuming $T_{TA} = 0$, where the PDSCH provides the timing advance command and $T_{TA}$ is defined in [4, TS 38.211]. |
| If a UE changes an active UL BWP between a time of a timing advance command reception and a time of applying a corresponding adjustment for the uplink transmission timing, the UE determines the timing advance command value based on the SCS of the new active UL BWP. If the UE changes an active UL BWP after applying an adjustment for the uplink transmission timing, the UE assumes a same absolute timing advance command value before and after the active UL BWP change. |
| If the received downlink timing changes and is not compensated or is only partly compensated by the uplink timing adjustment without timing advance command as described in [10, TS 38.133], the UE changes $N_{TA}$ accordingly. If a UE operates with two TAGs on an active UL BWP of a serving cell, the UE expects that a difference between a first downlink timing associated with a first TAG and a second downlink timing associated with a second TAG is not larger than the CP length for the active UL BWP unless the UE indicates larger-thanCP-capability. If a UE indicates XYZ_capability, is provided SRS-autonomousTAupdate [10, TS 38.133], and transmits SRS based on a configuration by SRS-PosResourceSet in SRS-PosRRC-InactiveConfig-ValidityArea in RRC_INACTIVE state, the UE may autonomously update $N_{TA}$ at cell reselection; else, if the UE is not provided SRS- |

TABLE 5-continued

| 4.2 Transmission timing adjustments |
|---|
| autonomousTAupdate, the UE maintains the $N_{TA}$ of a last serving cell prior to the release of a dedicated RRC connection [11, TS 38.321]. For operation with single TAG on a serving cell, if two adjacent slots overlap due to a TA command, the latter slot is reduced in duration relative to the former slot. The UE does not change $N_{TA}$ during an actual transmission time window for a PUSCH or a PUCCH transmission [6, TS 38.214]. If the UE is not provided enableSTx2PofMDCI and operates with two TAGs on a serving cell, the UE does not expect transmissions associated with different TAGs to overlap unless the UE indicates XYZ; if the UE indicates XYZ, the UE reduces in duration a latter transmission using a first TAG to avoid overlapping with a former transmission using a second TAG. |

Case 2) Method of Configuring Through Timing Advance Command (MAC-CE)

For example, $N_{TA}$ may be determined/configured based on MAC-CE. Specifically, $N_{TA}$ may be determined based on timing advance command MAC CE. The timing advance command MAC CE may include a timing advance command. Since the determination of $N_{TA}$ based on the timing advance command is the same as what was described in the Case 1, duplicate descriptions are omitted (see Table 4). The timing advance command MAC CE is described below with reference to FIG. 2.

Figure 2:
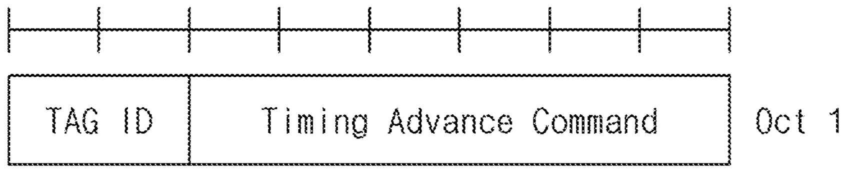
FIG. 2 illustrates timing advance command MAC CE according to an embodiment of the present disclosure.

FIG. 2 illustrates timing advance command MAC CE according to an embodiment of the present disclosure.

Referring to FIG. 2, timing advance command MAC CE may include a TAG ID and a timing advance command. Table 6 below shows payload of the timing advance command MAC CE.

TABLE 6

6.1.3.4 Timing Advance Command MAC CE
The Timing Advance Command MAC CE is identified by MAC subheader with LCID as specified in Table 6.2.1-1.
It has a fixed size and consists of a single octet defined as follows (FIG. 6.1.3.4-1):
- TAG Identity (TAG ID): This field indicates the TAG Identity of the addressed TAG. The TAG containing the SpCell has the TAG Identity 0. The length of the field is 2 bits;
- Timing Advance Command: This field indicates the index value $T_A$ (0, 1, 2... 63) used to control the amount of timing adjustment that MAC entity has to apply (as specified in TS 38.213 [6]). The length of the field is 6 bits.
6.1.3.4a Absolute Timing Advance Command MAC CE
The Absolute Timing Advance Command MAC CE is identified by MAC subheader with eLCID as specified in Table 6.2.1-1b.
It has a fixed size and consists of two octets defined as follows (FIG. 6.1.3.4a-1):
- Timing Advance Command: This field indicates the index value TA used to control the amount of timing adjustment that the MAC entity has to apply in TS 38.213 [6]. The size of the field is 12 bits;
- TI: If two TAGs are configured for SpCell, this field indicates one of the two TAGs to which the Timing Advance Command is applied. The field set to 0 indicates the first TAG ID and the field set to 1 indicates the second TAG ID. If two TAGs are not configured for SpCell, the R bit is present instead;
- R: Reserved bit, set to 0.

Timing Advance Group (TAG)

A timing advance group (TAG) refers to a group of serving cells that use the same timing advance value. Table 7 below shows definition of the TAG and configuration information related to the TAG.

TABLE 7

Timing Advance Group: A group of Serving Cells that is configured by RRC and that, for the cells with a UL configured, using the same timing reference cell and the same Timing Advance value. A Timing Advance Group containing the SpCell of a MAC entity is referred to as Primary Timing Advance Group (PTAG), whereas the term Secondary Timing Advance Group (STAG) refers to other TAGs.
TAG-Config
The IE TAG-Config is used to configure parameters for a time-alignment group.

TAG-Config information element

```
-- ASN1START
-- TAG-TAG-CONFIG-START
TAG-Config ::=                    SEQUENCE {
```

TABLE 7-continued

```
        tag-ToReleaseList                          SEQUENCE (SIZE (1..maxNrofTAGs)) OF TAG-Id
OPTIONAL,    -- Need N
        tag-ToAddModList                             SEQUENCE (SIZE (1..maxNrofTAGs)) OF TAG
OPTIONAL    -- Need N
}
TAG ::=                                      SEQUENCE {
        tag-Id                                         TAG-Id,
        timeAlignmentTimer                             TimeAlignmentTimer,
        ...
}
TAG-Id ::=                                 INTEGER (0..maxNrofTAGs-1)
   tag-Id
   Indicates the TAG of the SpCell or an SCell, see TS 38.321 [3]. Uniquely identifies the TAG
   within the scope of a Cell Group (i.e. MCG or SCG).
   timeAlignmentTimer
   The timeAlignmentTimer for TAG with ID tag-Id, as specified in TS 38.321. [3]
   maxNrofTAGs                    INTEGER ::= 4 -- Maximum number of Timing Advance Groups
-          CellGroupConfig
The CellGroupConfig IE is used to configure a master cell group (MCG) or secondary cell group
(SCG). A cell group comprises of one MAC entity, a set of logical channels with associated RLC
entities and of a primary cell (SpCell) and one or more secondary cells (SCells).
                                CellGroupConfig information element
-- ASN1START
-- TAG-CELLGROUPCONFIG-START
-- Configuration of one Cell-Group:
CellGroupConfig ::=                                  SEQUENCE {
cellGroupId                                            CellGroupId,
        rlc-BearerToAddModList                                  SEQUENCE (SIZE(1..maxLC-ID)) OF
RLC-BearerConfig                                     OPTIONAL,    -- Need N
        rlc-BearerToReleaseList                                 SEQUENCE (SIZE(1..maxLC-ID)) OF
LogicalChannelIdentity                          OPTIONAL,    -- Need N
        mac-CellGroupConfig                                                    MAC-CellGroupConfig
OPTIONAL,    -- Need M
        physicalCellGroupConfig                                            PhysicalCellGroupConfig
OPTIONAL,    -- Need M
        spCellConfig                                                                  SpCellConfig
OPTIONAL,    -- Need M
        sCellToAddModList                                       SEQUENCE (SIZE (1..maxNrofSCells))
OF SCellConfig                                OPTIONAL,    -- Need N
        sCellToReleaseList                                      SEQUENCE (SIZE (1..maxNrofSCells))
OF SCellIndex                                 OPTIONAL,    -- Need N
                                                    (...)
MAC-CellGroupConfig
The IE MAC-CellGroupConfig is used to configure MAC parameters for a cell group, including
DRX.
                              MAC-CellGroupConfig information element
-- ASN1START
-- TAG-MAC-CELLGROUPCONFIG-START
MAC-CellGroupConfig ::=                    SEQUENCE {
        drx-Config                                                     SetupRelease { DRX-Config }
OPTIONAL,    -- Need M
        schedulingRequestConfig                                           SchedulingRequestConfig
OPTIONAL,    -- Need M
        bsr-Config                                                                      BSR-Config
OPTIONAL,    -- Need M
        tag-Config                                                                      TAG-Config
OPTIONAL,    -- Need M
        phr-Config                                                     SetupRelease { PHR-Config }
OPTIONAL,    -- Need M
        skipUplinkTxDynamic                          BOOLEAN,
                                                    (...)
CellGroupId
The IE CellGroupId is used to identify a cell group. Value 0 identifies the master cell group. Other
values identify secondary cell groups. In this version of the specification only values 0 and 1 are
supported.
                                    CellGroupId information element
-- ASN1START
-- TAG-CELLGROUPID-START
CellGroupId ::=                                        INTEGER (0..maxSecondaryCellGroups)
-- TAG-CELLGROUPID-STOP
-- ASN1STOP
   maxSecondaryCellGroups INTEGER ::= 3
```

Procedure

Uplink time alignment may be performed based on Table 8 below.

TABLE 8

5.2 Maintenance of Uplink Time Alignment

RRC configures the following parameters for the maintenance of UL time alignment:
- timeAlignmentTimer (per TAG) which controls how long the MAC entity considers the Serving Cells belonging to the associated TAG to be uplink time aligned;
- inactivePosSRS-TimeAlignmentTimer which controls how long the MAC entity considers the Positioning SRS transmission in RRC_INACTIVE in clause 5.26 to be uplink time aligned;
- cg-SDT-TimeAlignmentTimer which controls how long the MAC entity considers the uplink transmission for CG-SDT to be uplink time aligned.

The MAC entity shall:

1> when a Timing Advance Command MAC CE is received, and if an $N_{TA}$ (as defined in TS 38.211 [8]) has been maintained with the indicated TAG:
  2> apply the Timing Advance Command for the indicated TAG;
  2> if there is ongoing Positioning SRS Transmission in RRC_INACTIVE as in clause 5.26:
    3> start or restart the inactivePosSRS-TimeAlignmentTimer associated with the indicated TAG.
  2> if CG-SDT procedure triggered as in clause 5.27 is ongoing:
    3> start or restart the cg-SDT-TimeAlignmentTimer associated with the indicated TAG.
  2> else:
    3> start or restart the timeAlignmentTimer associated with the indicated TAG.
1> when a Timing Advance Command is received in a Random Access Response message for a Serving Cell belonging to a TAG or in a MSGB for an SpCell:
  2> if the Random Access Preamble was not selected by the MAC entity among the contention-based Random Access Preamble:
    3> apply the Timing Advance Command for this TAG;
    3> start or restart the timeAlignmentTimer associated with this TAG.
  2> else if the timeAlignmentTimer associated with this TAG is not running:
    3> apply the Timing Advance Command for this TAG;
    3> start the timeAlignmentTimer associated with this TAG;
    3> when the Contention Resolution is considered not successful as described in clause 5.1.5; or
    3> when the Contention Resolution is considered successful for SI request as described in clause 5.1.5, after transmitting HARQ feedback for MAC PDU including UE Contention Resolution Identity MAC CE:
      4> stop timeAlignmentTimer associated with this TAG.
    3> when the Contention Resolution is considered not successful as described in clause 5.1.5:
      4> if CG-SDT procedure triggered as in clause 5.27 is ongoing:
        5> set the $N_{TA}$ value to the value before applying the received Timing Advance Command as in TS 38.211 [8].
    3> when the Contention Resolution is considered successful for Random Access procedure while the CG-SDT procedure is ongoing:
      4> stop timeAlignmentTimer associated with this TAG;
      4> start or restart the cg-SDT-TimeAlignmentTimer associated with this TAG.
    3> when the Contention Resolution is considered successful for Random Access procedure while SRS transmission in RRC_INACTIVE is ongoing:
      4> start or restart the inactivePosSRS-TimeAlignmentTimer associated with this TAG.
  2> else:
    3> ignore the received Timing Advance Command.
1> when an Absolute Timing Advance Command is received in response to a MSGA transmission including C-RNTI MAC CE as specified in clause 5.1.4a:
  2> apply the Timing Advance Command for PTAG;
  2> if there is ongoing Positioning SRS Transmission in RRC_INACTIVE as in clause 5.26:
    3> start or restart the inactivePosSRS-TimeAlignmentTimer associated with the indicated TAG.
  2> if CG-SDT procedure is ongoing:
    3> start or restart the cg-SDT-TimeAlignmentTimer associated with PTAG.
  2> else:
    3> start or restart the timeAlignmentTimer associated with PTAG.
1> when the indication is received from upper layer for stopping the inactivePosSRS-TimeAlignmentTimer:
  2> stop the inactivePosSRS-TimeAlignmentTimer.
1> when the indication is received from upper layer for starting the inactivePosSRS-TimeAlignmentTimer:
  2> start or restart the inactivePosSRS-TimeAlignmentTimer.
1> when instruction from the upper layer has been received for starting the cg-SDT-TimeAlignmentTimer:
  2> start the cg-SDT-TimeAlignmentTimer.
1> when instruction from the upper layer has been received for stopping the cg-SDT-TimeAlignmentTimer:
  2> consider the cg-SDT-TimeAlignmentTimer as expired.
1> when instruction from the upper layer has been received for starting the TimeAlignmentTimer associated with PTAG:
  2> start the TimeAlignmentTimer associated with PTAG.
1> when a timeAlignmentTimer expires:

TABLE 8-continued

| 5.2 Maintenance of Uplink Time Alignment |
|---|
| 2> if the timeAlignmentTimer is associated with the PTAG:<br>3> flush all HARQ buffers for all Serving Cells;<br>3> notify RRC to release PUCCH for all Serving Cells, if configured;<br>3> notify RRC to release SRS for all Serving Cells, if configured;<br>3> clear any configured downlink assignments and configured uplink grants;<br>3> clear any PUSCH resource for semi-persistent CSI reporting;<br>3> consider all running timeAlignmentTimers as expired;<br>3> maintain $N_{TA}$ (defined in TS 38.211 [8]) of all TAGs.<br>2> else if the timeAlignmentTimer is associated with an STAG, then for all Serving Cells belonging to this TAG:<br>3> flush all HARQ buffers;<br>3> notify RRC to release PUCCH, if configured;<br>3> notify RRC to release SRS, if configured;<br>3> clear any configured downlink assignments and configured uplink grants;<br>3> clear any PUSCH resource for semi-persistent CSI reporting;<br>3> maintain $N_{TA}$ (defined in TS 38.211 [8]) of this TAG.<br>1> when the inactivePosSRS-TimeAlignmentTimer expires:<br>2> notify RRC to release Positioning SRS for RRC_INACTIVE configuration(s).<br>1> when the cg-SDT-TimeAlignmentTimer expires:<br>2> clear any configured uplink grants;<br>2> if a PDCCH addressed to the MAC entity's C-RNTI after initial transmission for the CG-SDT with CCCH message has not been received:<br>3> consider ongoing CG-SDT procedure as terminated;<br>3> indicate the expiry of cg-SDT-TimeAlignmentTimer to the upper layer.<br>2> flush all HARQ buffers;<br>2> maintain $N_{TA}$ (defined in TS 38.211 [8]) of this TAG.<br>When the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity considers the timeAlignmentTimer associated with the SCell as expired.<br>The MAC entity shall not perform any uplink transmission on a Serving Cell except the Random Access Preamble and MSGA transmission when the timeAlignmentTimer associated with the TAG to which this Serving Cell belongs is not running, CG-SDT procedure is not ongoing or SRS transmission in RRC_INACTIVE as in clause 5.26 is not on-going.<br>Furthermore, when the timeAlignmentTimer associated with the PTAG is not running, CG-SDT procedure is not ongoing and SRS transmission in RRC_INACTIVE as in clause 5.26 is not ongoing, the MAC entity shall not perform any uplink transmission on any Serving Cell except the Random Access Preamble and MSGA transmission on the SpCell.<br>The MAC entity shall not perform any uplink transmission except the Random Access Preamble and MSGA transmission when the cg-SDT-TimeAlignmentTimer is not running during the ongoing CG-SDT procedure as triggered in clause 5.27. The MAC entity shall not perform any uplink transmission except the Random Access Preamble and MSGA transmission when inactivePosSRS-TimeAlignmentTimer is not running during the procedure for SRS transmission in RRC_INACTIVE as in clause 5.26. |

The contents of the foregoing may be applied in combination with the methods proposed in this specification, which will be described later, or may be supplemented to clarify the technical characteristics of the methods proposed in this specification. The methods described below are only classified for convenience of explanation, and some components of one method may be substituted with some components of another method or may be applied in combination with each other.

According to 3GPP standards until NR Rel-17, handover operation by UE mobility is performed as follows. A UE reports (L3-based) RSRP measurement for candidate serving cell(s) that is a non-serving cell. A base station (BS) performs handover decision based on the report and then triggers handover to the UE. In this instance, the UE performs a detach on a serving cell and performs a RACH procedure for synchronization with a new cell. The UE can obtain, from a cell that intends to newly perform an attach, TA information on the cell through RAR reception.

In Rel-18 mobility enhancement, there is ongoing discussion about BS/UE operation to reduce delay (by skipping the RACH procedure) when the BS/UE acquires TA information on the candidate serving cell(s) before a handover command to perform handover (see Table 9 below). As a method of acquiring TA for the candidate (serving) cell(s), RACH-based approach and RACH-less approach are considered.

TABLE 9

| |
|---|
| <RP-213565><br>1. To specify mechanism and procedures of L1/L2 based inter-cell mobility for mobility latency reduction:<br>o Configuration and maintenance for multiple candidate cells to allow fast application of configurations for candidate cells [RAN2, RAN3]<br>o Dynamic switch mechanism among candidate serving cells (including SpCell and SCell) for the potential applicable scenarios based on L1/L2 signalling [RAN2, RAN1]<br>o L1 enhancements for inter-cell beam management, including L1 measurement and reporting, and beam indication [RAN1, RAN2] |

TABLE 9-continued

| |
|---|
| - Note 1: Early RAN2 involvement is necessary, including the possibility of further clarifying the interaction between this bullet with the previous bullet |
| o Timing Advance management [RAN1, RAN2] |
| o CU-DU interface signaling to support L1/L2 mobility, if needed [RAN3] |

In Rel-18 mobility-TA management, agreement was reached as shown in Table 10 below.

TABLE 10

Agreement
Support TA acquisition of candidate cell(s) before cell switch command is received in L1/L2 based mobility.
- FFS: whether this can be applied to candidate cell when it is deactivated SCell (if defined in RAN2)

Agreement
On mechanism to acquire TA of the candidate cells, the following solutions can be further studied:
- RACH-based solutions
  e.g., PDCCH ordered RACH, UE-triggered RACH, higher layer triggered RACH from NW other than L3 HO cmd
- RACH-less solutions
  e.g., SRS based TA acquisition, Rx timing difference based, RACH-less mechanism as in LTE, UE based TA measurement (including UE based TA measurement with one TAC from serving cell)

Agreement
For TA acquisition of a candidate cell before cell switch command is received, study at least the following alternatives of associating TA/TAG to candidate cell:
- Alt1: Associate TA/TAG and candidate cell implicitly, e.g.,
  - the association between TA/TAG and TCI states can be configured
- Alt2: Associate TA/TAG and candidate cell explicitly, e.g.,
  - the association is provided as a part of candidate cell(s) configuration
  - the association between TA/TAG and SSB(s)/TRS(s) is provided as a part of candidate cell(s) configuration Agreement
On mechanism to acquire TA of the candidate cell(s) in Rel-18 LTM, at least support PDCCH ordered RACH.
- The PDCCH order is only triggered by source cell
- FFS: the details including content of DCI, RACH resource configuration, RAR transmission mechanism, etc.
- Note: any other RACH-based solutions are for discussion separately Agreement
For PDCCH ordered RACH in LTM, at least the following enhancements are supported
- Introduce indication of candidate cell and/or RO of candidate cell in DCI
- configuration of RACH resource for candidate cell(s) is provided prior to the PDCCH order
- FFS: whether/how to transmit RAR Agreement
On whether RAR is needed for PDCCH ordered RACH for a candidate cell in LTM, the following alternatives are considered for further study
- Alt 1: RAR is needed
- Alt 2: RAR is not needed
  - Note: If Alt 2 is supported, TA value of candidate cell is indicated in cell switch command
- Alt 3: whether RAR is needed can be configured Agreement
- TA updating (i.e. re-acquisition of TA) for candidate cell can be triggered by NW.
  - same triggering mechanism reuse the initial TA acquisition, i.e., PDCCH order triggered RACH in a candidate cell Agreement
For Rel-18 LTM, Random Access Preamble indices and indication of RACH occasions with the associated SSB indices are configured for each candidate cell.
Note: the detailed signalling is left to RAN2

Agreement
The PDCCH order from the source cell contains the indication of candidate cell.
■ The reserved bit(s) in DCI format 1_0 for PDCCH order can be used for indication of cell identity Agreement
For PDCCH ordered-RACH for candidate cell(s), RAR reception can be configured/indicated
■ If reception of RAR is not configured/indicated (without RAR)
  - TA value of candidate cell is indicated in cell switch command
  - FFS: whether UE should re-transmit PRACH when reception of RAR is not configured/indicated
  - FFS: how UE determine the transmit power of subsequent PRACH triggered by PDCCH order
■ If reception of RAR is configured/indicated (with RAR), FFS
  - whether RAR is received from serving cell or candidate cell
    ◆ if RAR is received from candidate cell, whether Type1-PDCCH CSS of the candidate cell is configured to the UE
  - content of RAR
■ FFS: signaling for configuration/indication of whether RAR needs to be received
■ UE can report the support combination of with RAR only and without RAR only, where support of one default scheme is the baseline UE approach for LTM
■ Send LS to RAN2 and RAN3 to check the feasibility about this agreement
■ Note: Definition of candidate cells is up to RAN2

Agreement
- For PDCCH-order based RACH for TA measurement for candidate cells, legacy CBRA is not supported TABLE 10-continued

| |
|---|
| Agreement<br>on whether UE should initiate re-transmit PRACH when reception of RAR is not configured/indicated, down select one from the following alternatives.<br>• Alt 1: UE autonomous re-transmission of PRACH is not allowed (e.g., by setting the number of allowed PRACH transmission to the minimum value of PreambleTransMax=1)<br>• Alt 2: UE autonomous Re-transmission of PRACH is allowed,<br>  • The number of PRACH transmission will be defined e.g. set the times of RACH transmission to the minimum value of PreambleTransMax<br>Agreement<br>If reception of RAR is configured/indicated, RAR contains at least TA of candidate cell.<br>• The maximum number of TA values memorized by UE is a UE capability<br>• FFS: whether other parameters such as UE ID, candidate cell ID etc. is contained in RAR<br>Agreement<br>Whether RAR needs to be received is configured by RRC.<br>Agreement<br>study at least the following issues on PDCCH-order based PRACH for candidate cell that is not UL serving cell, i.e. without PUCCH/PUSCH configured<br>  • Whether gap between the DCI and PRACH longer than timeline defined in spec is needed<br>  • Any impact/interruption on UL Tx of serving CCs due to the PRACH Tx<br>Working Assumption<br>UE-based TA measurement (UE derives TA based on Rx timing difference between current serving cell and candidate cell as well as TA value for the current serving cell) is supported.<br>• Corresponding UE capability is to be introduced to support UE-based TA measurement<br>• For a UE reports support of this capability, configuration of UE-based TA measurement is supported<br>FFS: other impacts on RAN1 spec |

In summary, a PDCCH ordered CFRA procedure may be used in RACH-based approach for TA acquisition of candidate cell(s). Whether RAR for the corresponding RACH transmission exists or not may be configured based on RRC. PRACH configuration for the candidate cell(s) for the RACH transmission of the candidate cell(s) may be pre-configured to the UE. Ordering DCI (PDCCH order DCI) may trigger RACH transmission of the UE for the candidate cell(s). For example, ID of the candidate cell(s) and/or RACH resource for the candidate cell(s) may be indicated based on the DCI. If the RAR exists, it is being discussed whether the RAR will be transmitted in the serving cell or the candidate cell.

QCL assumption of RAR scheduling DCI and RAR PDSCH included in RAR (MSG2) may be based on Tables 11 and 12 below.

TABLE 11

| |
|---|
| If the UE detects a DCI format 1_0 with CRC scrambled by the corresponding RA-RNTI and LSBs of a SFN field in the DCI format 1_0, if included and applicable, are same as corresponding LSBs of the SFN where the UE transmitted the PRACH, and the UE receives a transport block in a corresponding PDSCH, the UE may assume same DM-RS antenna port quasi co-location properties, as described in [6, TS 38.214], as for a SS/PBCH block or a CSI-RS resource the UE used for PRACH association, as described in clause 8.1, regardless of whether or not the UE is provided TCI-State for the CORESET where the UE receives the PDCCH with the DCI format 1_0.<br>If the UE attempts to detect the DCI format 1_0 with CRC scrambled by the corresponding RA-RNTI in response to a PRACH transmission initiated by a PDCCH order that triggers a contention-free random access procedure for the SpCell [11, TS 38.321], the UE may assume that the PDCCH that includes the DCI format 1_0 and the PDCCH order have same DM-RS antenna port quasi co-location properties. If the UE attempts to detect the DCI format 1_0 with CRC scrambled by the corresponding RA-RNTI in response to a PRACH transmission initiated by a PDCCH order that triggers a contention-free random access procedure for a secondary cell, the UE may assume the DM-RS antenna port quasi co-location properties of the CORESET associated with the Type1-PDCCH CSS set for receiving the PDCCH that includes the DCI format 1_0. |

The QCL assumption of PDCCH scheduling RAR after PDCCH ordered RACH may be based on Table 11.

For example, PRACH related to SpCell may have QCL properties in which PDCCH order and RAR scheduling PDCCH are the same.

For example, for PRACH related to SCell, the RAR scheduling PDCCH may follow QCL properties based on CORESET related to Type1-PDCCH CSS set.

TABLE 12

| |
|---|
| When receiving PDSCH scheduled with RA-RNTI, or MSGB-RNTI, the UE may assume that the DM-RS port of PDSCH is quasi co-located with the SS/PBCH block or the CSI-RS resource the UE used for RACH association as applicable, and transmission with respect to Doppler shift, Doppler spread, average delay, delay spread, spatial RX parameters when applicable. When receiving a PDSCH scheduled with RA-RNTI in response to a random access procedure triggered by a PDCCH order which triggers contention-free random access procedure for the SpCell [10, TS 38.321], the UE may assume that the DM-RS port of the received PDCCH order and the DM-RS ports of the corresponding PDSCH scheduled with RA-RNTI are quasi co-located with the same SS/PBCH block or CSI-RS with respect to Doppler shift, Doppler spread, average delay, delay spread, spatial RX parameters when applicable. |

The QCL assumption for RAR PDSCH may be based on Tables 11 and 12.

For example, regardless of the QCL assumption receiving the RAR scheduling PDCCH, RAR PDSCH may be received based on QCL properties of SSB or CSI-RS used in PRACH transmission.

For example, for the PRACH related to the SpCell, DMRS port(s) of the RAR PDSCH and DMRS port of the PDCCH order may be assumed to be quasi co-located (QCLed) with the same SS/PBCH block or CSI-RS resource. The SS/PBCH block (or CSI-RS resource) may be SS/PBCH block (or CSI-RS resource) used in a PRACH association.

For example, for the PRACH related to SCell, QCL properties related to the RAR PDSCH may be the same as the SS/PBCH block (or CSI-RS resource) used in the PRACH association.

Based on the PDCCH order being related to a different cell (e.g., candidate cell or additional PCI) from the serving cell, the RAR may be received from the serving cell or the non-serving cell.

For example, the following three cases may exist in relation to reception of the RAR.

#Case 0: RAR Reception from the Serving Cell ex1) The PDCCH order is received from the non-serving cell, and the RAR is received from the serving cell ex2) The PDCCH order is received from the serving cell, and the RAR is received from the serving cell

#Case 1: RAR Reception from the Non-Serving Cell ex1) The PDCCH order is received from the serving cell, and the RAR is received from the non-serving cell

#Case 2: Both the PDCCH Order and the RAR are Received from the Non-Serving Cell For example, the three cases may be related to Rel-18 LTM or inter-cell M-DCI based M-TRP operation. As a specific example, the PDCCH order may be related to a candidate cell.

For example, the three cases may be related to the inter-cell M-DCI based M-TRP operation. As a specific example, the PDCCH order may be related to an additional PCI. More specifically, CORESET for the PDCCH order may be related to additionalPCI. The additionalPCI may be related to a CORESET pool index different from a PCI of the serving cell. The PCI of the serving cell may be related to CORESET pool index 0 (or 1), and the additionalPCI may be related to CORESET pool index 1 (or 0).

If both PDCCH order DCI and RAR scheduling DCI are transmitted by the serving cell, QCL assumption between two signals is not different from the existing defined QCL assumption (see Tables 11 and 12 above). Specifically, according to the existing definition (e.g., Tables 11 and 12), RAR PDCCH/PDSCH and PDCCH order may have the same QCL properties (e.g., SS/PBCH block or CSI-RS resource used for PRACH association). Therefore, a problem may not occur in RAR reception.

However, if the PDCCH order DCI and the RAR scheduling DCI are transmitted by different cells (e.g., non-serving cell and serving cell or serving cell and non-serving cell), a problem may occur in the RAR reception. That is, QCL properties according to the existing definition (Tables 11 and 12) may not be suitable to apply the RAR reception. This is described in detail below.

A cell related to transmission of the PDCCH order is different from a cell related to RAR (PDCCH/PDSCH) transmission. Therefore, it may be inefficient to receive the RAR (PDCCH/PDSCH) based on QCL properties related to any one cell (e.g., the same QCL properties as the PDCCH order), and a problem may occur in the RAR reception.

As a specific example, referring to Tables 11 and 12, the QCL properties related to the PDCCH order may be based on SS/PBCH block or CSI-RS resource used for PRACH association. If the existing definition is applied as it is, the SS/PBCH block or the CSI-RS resource may be SS/PBCH block (or CSI-RS resource) used for PRACH transmission that targets the non-serving cell (e.g., candidate cell or additionalPCI). Therefore, if QCL properties based on the SS/PBCH block (or CSI-RS resource) used for PRACH transmission that targets the non-serving cell are applied to RAR reception from the serving cell, a problem may occur in the RAR reception.

The above-mentioned problem is referred to as <Problem 1>.

In addition, in the Case 1, additional type 1 CSS for receiving RAR scheduling DCI from the non-serving cell may be configured to the UE per cell. The corresponding CSS may be configured/connected to a specific CORESET of the UE. In this instance, there may be ambiguity about what QCL assumption the specific CORESET should have. This problem is referred to as <Problem 2>.

Based on this background, the present disclosure describes a method for a base station to configure/indicate RACH transmission destined for a non-serving cell (candidate serving cell or additionalPCI) of a UE and a method of transmitting a RACH response and proposes a UE operation related thereto.

In the present disclosure, '/' can be interpreted as 'and', 'or', or 'and/or' depending on the context. A non-serving cell that can be a target of UE handover can be used interchangeably as a candidate serving cell, a candidate cell, a target cell, a target candidate cell, etc.

In addition, the base station can perform configuration for one or more candidate cell information before a handover command for Rel-18 LTM. The configuration for the candidate cell information may include PCI, RACH configuration (e.g., RACH preamble, RACH occasion, RACH resource, or/and SSB index, etc. related to each candidate cell), etc. for each candidate cell that is a non-serving cell that can be a potential serving cell. For example, a procedure related to LTM may be based on FIG. 3.

Figure 3:
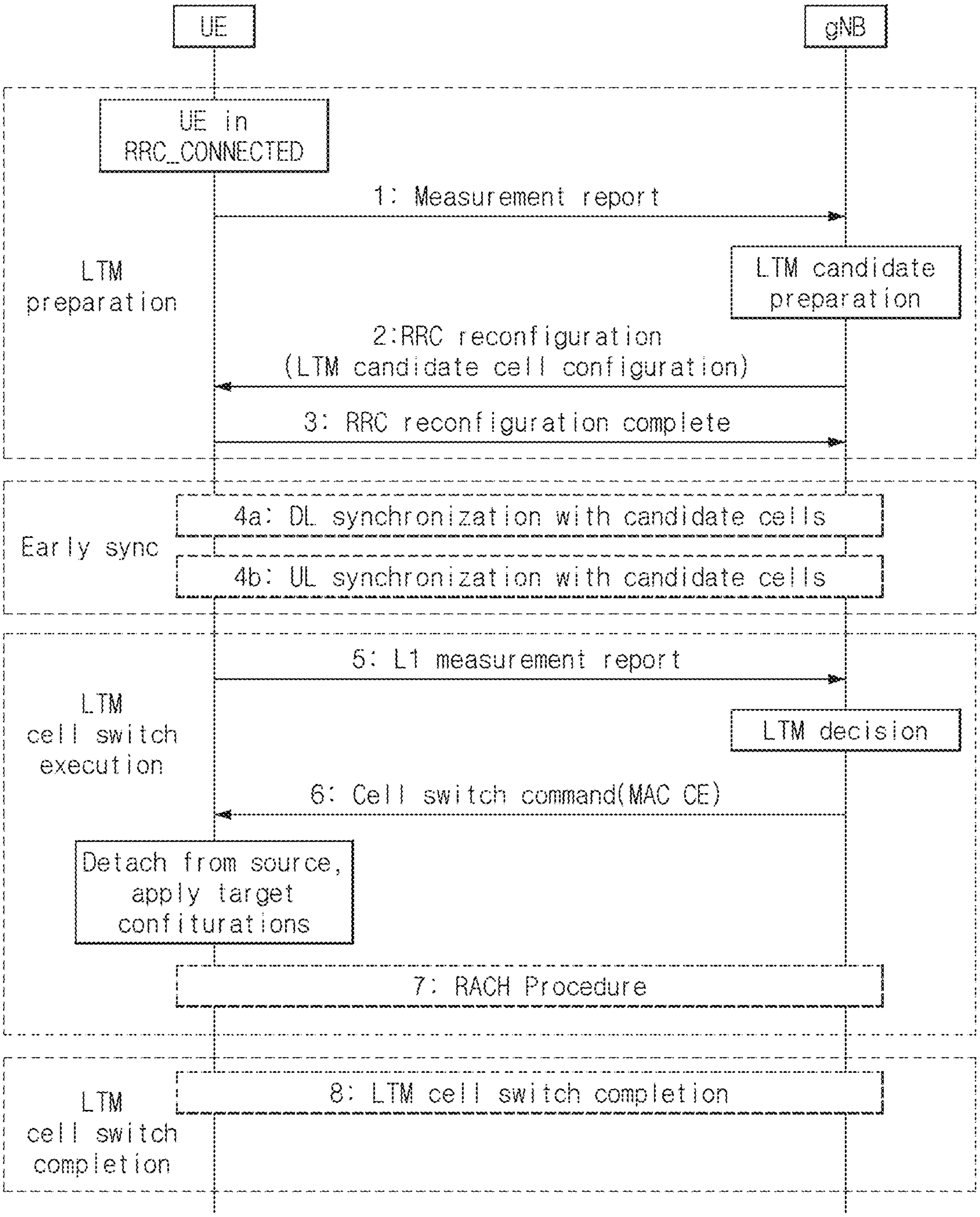
FIG. 3 illustrates a procedure related to LTM to which a method according to an embodiment of the present disclosure is applicable.

FIG. 3 illustrates a procedure related to LTM to which a method according to an embodiment of the present disclosure is applicable. Specifically, the procedure related to the LTM may be performed based on Table 13 below.

TABLE 13

9.2.3.5 L1/L2-Triggered Mobility
9.2.3.5.1 General

LTM is a procedure in which a gNB receives L1 measurement report(s) from a UE, and on their basis the gNB changes UE serving cell by a cell switch command signalled via a MAC CE. The cell switch command indicates an LTM candidate configuration that the gNB previously prepared and provided to the UE through RRC signalling. Then the UE switches to the target configuration according to the cell switch command. The LTM procedure can be used to reduce the mobility latency as described in Annex G.

When configured by the network, it is possible to activate TCI states of one or multiple cells that are different from the current serving cell. For instance, the TCI states of the LTM candidate cells can be activated in advance before any of those cells become the serving cell. This allows the UE to be DL synchronized with those cells, thereby facilitating a faster cell switch to one of those cells when cell switch is triggered.

When configured by the network, it is possible to initiate UL TA acquisition (called early TA) procedure of one or multiple cells that are different from the current serving cells. If the cell has the same $N_{TA}$ as the current serving cells or $N_{TA}=0$, early TA acquisition procedure is not required. The network may request the UE to perform early TA acquisition of a candidate cell before a cell switch. The early TA acquisition procedure is triggered by PDCCH order as specified in clause 9.2.6 or realized through UE-based TA measurement as configured by RRC. In the former case, the gNB to which the candidate cell belongs calculates the TA value and sends it to the gNB to which the serving cell belongs. The serving cell sends the TA value in the LTM cell switch command MAC CE when triggering LTM cell switch. In the latter case, the UE performs TA measurement for the candidate cells after being configured by RRC but the exact time the UE performs TA measurement is up to UE implementation. The UE applies the TA value measured by itself and performs RACH-less LTM upon receiving the cell switch command. The network may also send a TA value in the LTM cell switch command MAC CE without early TA acquisition.

Depending on the availability of a valid TA value, the UE performs either a RACH-less LTM or RACH-based LTM cell switch. If the TA value is provided in the cell switch command, the UE applies the TA value as instructed by the network. In the case where UE-based TA measurement is configured, but no TA value is provided in the cell switch command, the UE applies the TA value by itself if available. Meanwhile, the UE performs RACH-less LTM cell switch upon receiving the cell switch command. If no valid TA value is available, the UE performs RACH-based LTM cell switch. Regardless of whether the UE is configured for UE-based TA measurement for a certain candidate cell, it will still follow the PDCCH order, which includes requesting a random access procedure towards the candidate cells. This also applies to the candidate cells for which the UE is capable of deriving TA values by itself. Additionally, regardless of whether the UE has already performed a random access procedure towards the candidate cells, it will still follow the UE-based measurement configuration if configured by the network.

For RACH-less LTM, the UE accesses the target cell using either a configured grant or a dynamic grant. The configured grant is provided in the LTM candidate configuration, and the UE selects the configured grant occasion associated with the beam indicated in the cell switch command. Upon initiation of LTM cell switch to the target cell, the UE starts to monitor PDCCH on the target cell for dynamic scheduling. Before RACH-less LTM procedure completion, the UE shall not trigger random access procedure if it does not have a valid PUCCH resource for triggered SRs.

The following principles apply to LTM:

- Security key is maintained upon an LTM cell switch;
- Subsequent LTM is supported.

LTM supports both intra-gNB-DU and intra-gNB-CU inter-gNB-DU mobility. LTM supports both intra-frequency and inter-frequency mobility, including mobility to inter-frequency cell that is not a current serving cell. LTM is supported only for licensed spectrum. The following scenarios are supported:

- PCell change in non-CA scenario and non-DC scenario;
- PCell and SCell(s) change in CA scenario;
- Dual connectivity scenario, PCell and MCG SCell(s) change and intra-SN PSCell and SCG SCell(s) change without MN involvement. LTM for simultaneous PCell and PSCell change is not supported.

While the UE has stored LTM candidate configurations the UE can also execute any L3 handover command sent by the network.

9.2.3.5.2 C-Plane Handling

Cell switch command is conveyed in a MAC CE, which contains the necessary information to perform the LTM cell switch.

The overall procedure for LTM is shown in Figure 9.2.3.5.2-1 below. Subsequent LTM is done by repeating the early synchronization, LTM cell switch execution, and LTM cell switch completion steps TABLE 13-continued

| |
|---|
| without releasing other LTM candidate configurations after each LTM cell switch completion. The general procedure over the air interface is applicable to SCG LTM. Further details of SCG LTM can be found in TS 37.340 [21]. |
| The procedure for LTM is as follows: |
| 1. The UE sends a MeasurementReport message to the gNB. The gNB decides to configure LTM and initiates LTM preparation. |
| 2. The gNB transmits an RRCReconfiguration message to the UE including the LTM candidate configurations. |
| 3. The UE stores the LTM candidate configurations and transmits an RRCReconfigurationComplete message to the gNB. |
| 4a. The UE performs DL synchronization with the candidate cell(s) before receiving the cell switch command. |
| 4b. When UE-based TA measurement is configured, UE acquires the TA value(s) of the candidate cell(s) by measurement. UE performs early TA acquisition with the candidate cell(s) as requested by the network before receiving the cell switch command as specified in clause 9.2.6. This is done via CFRA triggered by a PDCCH order from the source cell, following which the UE sends preamble towards the indicated candidate cell. In order to minimize the data interruption of the source cell due to CFRA towards the candidate cell(s), the UE does not receive random access response from the network for the purpose of TA value acquisition and the TA value of the candidate cell is indicated in the cell switch command. The UE does not maintain the TA timer for the candidate cell and relies on network implementation to guarantee the TA validity. |
| 5. The UE performs L1 measurements on the configured candidate cell(s) and transmits L1 measurement reports to the gNB. L1 measurement should be performed as long as RRC reconfiguration (step 2) is applicable. |
| 6. The gNB decides to execute cell switch to a target cell and transmits a MAC CE triggering cell switch by including the candidate configuration index of the target cell. The UE switches to the target cell and applies the configuration indicated by candidate configuration index. |
| 7. The UE performs the random access procedure towards the target cell, if UE does not have valid TA of the target cell as specified in clause 6.1.3.xy of TS 38.321 [6]. |
| 8. The UE completes the LTM cell switch procedure by sending RRCReconfigurationComplete message to target cell. If the UE has performed a RA procedure in step 7 the UE considers that LTM cell switch execution is successfully completed when the random access procedure is successfully completed. For RACH-less LTM, the UE considers that LTM cell switch execution is successfully completed when the UE determines that the network has successfully received its first UL data. |
| The steps 4-8 can be performed multiple times for subsequent LTM using the LTM candidate configuration(s) provided in step 2. |
| The procedure over the air interface described in Figure x is applicable to both intra-gNB-DU LTM and inter-gNB-DU LTM. The overall LTM procedures over F1-C interface are captured in TS 38.401 [4]. |
| 9.2.3.5.3 U-Plane Handling |
| After receiving an LTM cell switch command MAC CE, the UE performs MAC reset. Whether the UE performs RLC re-establishment and PDCP data recovery during cell switch is explicitly controlled by the network through RRC signalling. |

Embodiments for solving the problem 1 are described in detail in proposal 1.

Proposal 1

A method for a base station to transmit RAR PDSCH is described in detail below.

For example, if both RAR scheduling DCI and RAR PDSCH (as a response to RACH transmitted to a candidate cell) are transmitted by a serving cell, it may be impossible to assume that a UE receives the RAR PDSCH with the same QCL properties as SSB related to PRACH transmitted to a non-serving cell according to the existing definition (Tables 11 and 12).

The serving cell may have the following QCL assumption when transmitting the RAR PDSCH to the UE. That is, the UE may expect/assume the following QCL assumption when receiving the RAR PDSCH.

Method 1: Even if the RAR PDSCH is transmitted by the serving cell, the UE expects that the RAR PDSCH will have the same QCL properties as SSB related to PRACH transmitted to the non-serving cell (e.g., candidate cell or additional PCI) (at a previous time).

Method 2: The UE expects that the RAR PDSCH will have the same QCL properties as PDCCH including PDCCH order DCI (transmitted by the serving cell).

Method 3: The UE expects that the RAR PDSCH will have the same QCL properties as PDCCH including RAR scheduling DCI (transmitted by the serving cell). For example, the same QCL properties may be based on the existing defined QCL properties (e.g., Tables 11 and 12). As a specific example, the QCL properties may be based on CORESET related to Type1-PDCCH CSS set.

For example, the QCL properties of the method 3 may be based on Table 14 below.

TABLE 14

| |
|---|
| If the UE attempts to detect the DCI format 1_0 with CRC scrambled by the corresponding RA-RNTI in response to a PRACH transmission initiated by a PDCCH order that triggers a contention-free random access procedure for the SpCell [11, TS 38.321], the UE may assume that the PDCCH that includes the DCI format 1_0 and the PDCCH order have same DM-RS antenna port quasi co-location properties. If the UE attempts to detect the DCI format 1_0 with CRC scrambled by the corresponding RA-RNTI in response to a PRACH transmission initiated by a PDCCH order that triggers a contention-free random access procedure for a secondary cell, or if the UE is configured |

TABLE 14-continued

| |
|---|
| with twoTAGs for the SpCell and the CORESET where the UE receives the PDCCH order that triggers a contention-free random access procedure for the SpCell is not associated with the physical cell ID for the serving cell, the UE may assume the DM-RS antenna port quasi co-location properties of the CORESET associated with the Type1-PDCCH CSS set for receiving the PDCCH that includes the DCI format 1_0 and the PDSCH scheduled by the DCI format 1_0. |
| When receiving PDSCH scheduled with RA-RNTI, or MSGB-RNTI, the UE may assume that the DM-RS port of PDSCH is quasi co-located with the SS/PBCH block or the CSI-RS resource the UE used for RACH association as applicable, and transmission with respect to Doppler shift, Doppler spread, average delay, delay spread, spatial RX parameters when applicable. When receiving a PDSCH scheduled with RA-RNTI in response to a random access procedure triggered by a PDCCH order which triggers contention-free random access procedure for the SpCell [10, TS 38.321], the UE may assume that the DM-RS port of the received PDCCH order and the DM-RS ports of the corresponding PDSCH scheduled with RA-RNTI are quasi co-located with the same SS/PBCH block or CSI-RS with respect to Doppler shift, Doppler spread, average delay, delay spread, spatial RX parameters when applicable. If a UE is configured with SSB-MTC-AddtionalPCI and with PDCCH-Config that contains two different values of coresetPoolIndex in ControlResourceSet, and if the UE is configured with [twoTAGs] for the SpCell, if the UE attempts to detect the DCI format 1_0 with CRC scrambled by the corresponding RA-RNTI or when receiving a PDSCH scheduled with RA-RNTI in response to a random access procedure triggered by a PDCCH order which triggers contention-free random access procedure for the SpCell [10, TS 38.321], and if the CORESET used for the PDCCH order transmission is not associated with the serving cell physical cell ID, the UE may assume that the DM-RS ports of the received PDSCH are quasi co-located with the DM-RS antenna port associated with PDCCH receptions in the CORESET for Type1-PDCCH CSS set with respect to Doppler shift, Doppler spread, average delay, delay spread, and spatial RX parameters when applicable. |
| When the UE is configured with SSB-MTC-AdditionalPCI, ControlResourceSets corresponding to different coresetPoolIndex values may be associated with different physical cell IDs via activated TCI states of the ControlResourceSets, where ControlResourceSets corresponding to one coresetPoolIndex is associated with the serving cell physical cell ID and ControlResourceSets corresponding to another coresetPoolIndex can be associated with another physical cell ID. |

For example, the UE may receive the RAR PDSCH based on one of the methods 1/2/3. For example, combinations of two or more of the methods 1 to 3 (e.g., methods 1/2/3, methods 1/2, methods 2/3, or methods 1/3) may be configured by the base station. The UE may receive the RAR PDSCH based on one of the configured combinations.

For the method 1, configuration so that some SSBs of SSBs related to the serving cell are related to the candidate cell (or additionalPCI) may be performed in advance. For example, the UE may receive configuration (or RACH configuration) for the SSB related to each candidate cell (or additionalPCI). The UE may receive RACH configuration for each candidate cell (or additionalPCI).

For example, the SSB that the UE uses when transmitting RACH to the candidate cell (or additionalPCI) is an SSB configured (by the RACH configuration) for the candidate cell (or additionalPCI), but may be actually an SSB related to the serving cell.

Through the proposal 1, the UE can receive RAR without ambiguity in QCL assumption for the RAR (RAR scheduling DCI and/or RAR PDSCH).

Embodiments for solving the problem 2 are described in detail in proposal 2.

Proposal 2

A method for a base station to transmit RAR scheduling DCI and RAR PDSCH is described in detail below.

For example, both RAR scheduling DCI and RAR PDSCH (as a response to RACH transmitted to a non-serving cell (e.g., candidate cell or additionalPCI)) may be transmitted by a non-serving cell. In this instance, additional type 1 CSS for receiving RAR scheduling DCI may be configured to a UE per non-serving cell. The corresponding CSS may be configured/connected to a specific CORESET of the UE. In this case, QCL assumption for receiving the RAR scheduling DCI by the UE may follow QCL assumption configured/indicated to the specific CORESET. Operations related to this are described in detail below.

The UE may receive the RAR scheduling DCI (from the additional type 1 CSS) using QCL properties of SSB that is used when transmitting (CFRA-based) RACH for the non-serving cell at a previous time. In this instance, configuration/operation may be applied as follows. For example, a reference RS or TCI state for the QCL properties may not be configured to CORESET configured/connected to the additional type 1 CSS. For example, even if the reference RS or TCI state for the QCL properties is configured to the CORESET configured/connected to the additional type 1 CSS, the UE may ignore the corresponding configuration.

Additionally, the specific CORESET may be indicated based on DCI related to PDCCH order. The RAR scheduling DCI may be transmitted based on this. For example, the UE may receive the RAR scheduling DCI from the serving cell or the non-serving cell related to the specific CORESET.

In addition, the UE may receive the RAR PDSCH using QCL properties of SSB that is used when transmitting (CFRA-based) RACH for the non-serving cell at a previous time (in the same manner as the existing definition).

Additional embodiments of the proposals 1 and 2 are described below.

It may be assumed that the RAR scheduling DCI is transmitted by the serving cell, and the RAR PDSCH is transmitted by the non-serving cell. The UE may operate as follows. The UE may receive the RAR scheduling DCI in the same manner as the legacy operation. The UE may receive the RAR PDSCH based on the proposal 2.

It may be assumed that the RAR scheduling DCI is transmitted by the non-serving cell, and the RAR PDSCH is transmitted by the serving cell. The UE may operate as follows. The UE may receive the RAR scheduling DCI based on the proposal 2. The UE may receive the RAR PDSCH based on the proposal 1.

Embodiments of the proposals 1 and 2 can also be applied to the case 2 described above.

Additionally, the embodiments of the proposals 1 and 2 can also be applied when PDCCH ordered CFRA is triggered to acquire TA of TRP/TAG/CORESETPoolIndex related to additional PCI in an inter-cell M-DCI based M-TRP environment in Rel-18 MIMO—two TA.

CORESET pool index 0 may be related to the serving cell, and CORESET pool index 1 may be related to the non-serving cell (additional PCI). For example, in this case, in the cases 0/1/2, the “serving cell” may mean “TRP/TAG related to CORESET pool index 0” and the “non-serving cell” may mean “TRP/TAG related to CORESET pool index 1.” A physical cell ID (PCI) of the serving cell may be related to the CORESET pool index 0. PCI (additionalPCI) of a different cell from the serving cell may be related to the CORESET pool index 1.

In addition, the embodiments of the proposals 1 and 2 can also be applied when a specific TRP performs cross-TRP RACH triggering that triggers PDCCH ordered CFRA (for TA acquisition) for another TRP in an intra/inter-cell M-DCI based M-TRP environment in Rel-18 MIMO—two TA. For example, in this case, in the cases 0/1/2, the “serving cell” may mean “TRP performing PDCCH order” and the “non-serving cell” may mean “TRP receiving PRACH.”

The embodiments of the proposals 1 and 2 can be applied to UE/BS operation as a combination of one or more embodiments.

An example of UE (or BS) operation based on at least one of the above-described embodiments (e.g., at least one of the proposals 1 and 2) is as follows.

1) A UE (BS) receives (transmits) configuration information for candidate cells.

The configuration information for the candidate cells may include information based on at least one of the proposals 1 and 2. For example, the configuration information may include PCI, C_id, TAG id, or/and PRACH configuration related to each candidate cell.

2) The UE (BS) receives (transmits) a message configuring/indicating RACH transmission for the candidate cells. The message may be a PDCCH triggering/ordering CFRA-based RACH.
3) The UE (BS) transmits (receives) a RACH based on the message.
4) The UE (BS) receives (transmits) an RAR based on an RAR window.

The RAR may be received from a serving cell or the candidate cell. That is, a cell related to transmission of the RAR may be the serving cell or the candidate cell.

A transmission method and configuration of RAR scheduling DCI and RAR PDSCH related to the RAR may be based on at least one of the proposals 1 and 2.

The UE/BS operation is merely an example, and each operation (and step) is not necessarily essential. For example, the operation related to the RACH procedure according to the above-described embodiments may be omitted or added based on a UE/BS implementation method.

From an implementation perspective, operations of the UE/BS according to the above-described embodiments (e.g., operations based on at least one of the proposals 1 and 2) can be processed by a device (e.g., processors 110 and 210 of FIG. 6) of FIG. 6 to be described below.

Further, the operations of the UE/BS according to the above-described embodiments (e.g., operations based on at least one of the proposals 1 and 2) can be stored in a memory (e.g., memories 140 and 240 of FIG. 6) in the form of commands/programs (e.g., instructions, executable codes) for running at least one processor (e.g., processors 110 and 210 of FIG. 6).

Below, the above-described embodiments are described in detail from a UE/BS operation perspective with reference to FIGS. 4 and 5. Methods described below are merely distinguished for convenience of explanation. Thus, it is obvious that partial configuration of any method can be substituted or combined with partial configuration of another method.

Figure 4:
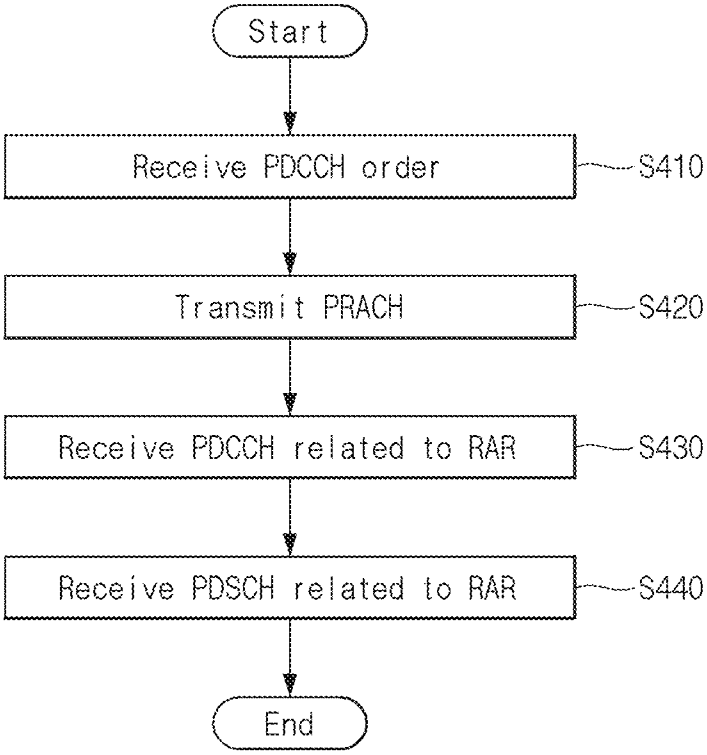
FIG. 4 is a flow chart illustrating a method performed by a user equipment according to an embodiment of the present disclosure.

FIG. 4 is a flow chart illustrating a method performed by a user equipment according to an embodiment of the present disclosure.

Referring to FIG. 4, a method performed by a user equipment (UE) according to an embodiment of the present disclosure may comprise a PDCCH order reception step S410, a PRACH transmission step S420, a PDCCH reception step S430 related to RAR, and a PDSCH reception step S440 related to RAR.

In the step S410, the UE receives, from a base station (BS), a physical downlink control channel (PDCCH) order related to an initiation of a random access procedure.

For example, the PDCCH order may be based on downlink control information (DCI).

For example, the random access procedure may be a contention free random access (CFRA) procedure.

For example, the random access procedure may be a Type-1 random access procedure (4 step RACH) or a Type-2 random access procedure (2 step RACH).

For example, the random access procedure may be for a special cell (SpCell) or a secondary cell (SCell). As a specific example, the random access procedure may be for a special cell (SpCell) to which two timing advance groups (TAGs) are configured. The SpCell may be a serving cell. A first physical cell ID described below may be a physical cell ID of the serving cell. A second physical cell ID described below may be related to a second CORESET pool index of two CORESET pool indexes.

More specifically, control resource sets (CORESETs) are configured for a bandwidth part (BWP) (e.g., DL BWP) of the serving cell. The CORESETs may include a first CORESET(s) based on a first CORESET pool index and a second CORESET(s) based on the second CORESET pool index. The second physical cell ID may be related to a second CORESET based on the second CORESET pool index. The second physical cell ID may be a physical cell ID based on additionalPCI.

For example, the PDCCH order may be related to i) a first cell or ii) a second cell different from the first cell. The first cell may be the serving cell, and the second cell may be a non-serving cell. Specifically, a control resource set (CORESET) used for transmission of the PDCCH order may be based on i) a first CORESET pool index related to the first cell or ii) a second CORESET pool index related to the second cell. That is, the CORESET used for the transmission of the PDCCH order may be i) the first CORESET based on the first CORESET pool index or ii) the second CORESET based on the second CORESET pool index.

For example, the non-serving cell may be a candidate cell. The candidate cell may be one of candidate cells configured to the UE. As a specific example, the candidate cell may be one of candidate cells configured based on the step 2 (LTM candidate cell configuration) of FIG. 3 and Table 9. For example, the non-serving cell may be based on a physical cell ID (additional PCI) related to the CORESET pool index different from the physical cell ID of the serving cell.

In the step S420, the UE transmits a physical random access channel (PRACH) to the base station.

For example, the PRACH may be related to a physical cell identity (PCI) of the first cell or a PCI of the second cell.

In the step S430, the UE receives, from the base station, a physical downlink control channel (PDCCH) related to a random access response (RAR).

In the step S440, the UE receives, from the base station, a physical downlink shared channel (PDSCH) related to the RAR.

For example, the RAR may be received based on the PDCCH and the PDSCH. The PDSCH is scheduled based on DCI (e.g., RAR scheduling DCI) related to the PDCCH. A transport block received based on the PDSCH may include the RAR.

As described in the problem 1, if the cell (e.g., additionalPCI based non-serving cell) related to transmission of the PDCCH order is different from a cell (e.g., serving cell) related to RAR (PDCCH/PDSCH), it may be inefficient to receive the PDCCH and the PDSCH based on the existing defined QCL properties (e.g., the same QCL properties as the PDCCH order), or and a problem may occur in the RAR reception. Embodiments for solving the problem are described in detail below.

According to an embodiment, based on a control resource set (CORESET) related to the PDCCH order being related to a second physical cell ID different from a first physical cell ID: the PDCCH and the PDSCH may be received based on quasi co-location (QCL) properties.

That is, the PDCCH and the PDSCH may be received based on the same QCL properties. The present embodiment may be based on the method 3 of the proposal 1 (e.g., Table 14). The QCL properties may be based on a CORESET related to Type1-PDCCH common search space (CSS) set. The Type1-PDCCH CSS set may be related to the serving cell.

For example, demodulation reference signal (DMRS) ports related to the PDSCH may be quasi co-located (QCLed) with a DMRS port for PDCCH reception. More specifically, the DMRS ports related to the PDSCH, with respect to the QCL properties, may be QCLed with a DMRS port for the PDCCH reception in the CORESET related to the Type 1-PDCCH CSS set.

For example, the QCL properties may include at least one of a Doppler shift, a Doppler spread, an average delay, a delay spread, and/or a spatial Rx parameter.

For example, the CORESET related to the PDCCH order may be a CORESET used for PDCCH order transmission. The CORESET may be related to one of different CORESET pool indexes. The CORESET may be the first CORESET or the second CORESET.

As a specific example, the first CORESET related to the first CORESET pool index may be related to the first physical cell ID (serving cell physical cell ID). The second CORESET related to the second CORESET pool index may be related to the second physical cell ID (another physical cell ID). The serving cell physical cell ID may be a physical cell ID (e.g., physCellId) based on a serving cell configuration (e.g., ServingCellConfigCommon) (related to the SpCell). The another physical cell ID may be a physical cell ID based on the additionalPCI.

The fact that the CORESET has been related to the second physical cell ID may mean that the CORESET is not related to the first physical cell ID. That is, the fact that the CORESET has been related to the second physical cell ID may mean that the CORESET is the second CORESET.

For example, the Type1-PDCCH CSS set may be related to the serving cell (e.g., the SpCell). As a specific example, the Type1-PDCCH CSS set may be configured based on configuration information (e.g., SIB1->ServingCellConfigCommonSIB->DownlinkConfigCommonSIB->initialDownlinkBWP->BWP-DownlinkCommon->pdcch-ConfigCommon->ra-SearchSpace) related to the serving cell. That is, the Type1-PDCCH CSS set may be configured based on parameter ra-SearchSpace within pdcch-ConfigCommon included in the configuration information related to the serving cell.

For example, the first physical cell ID and the second physical cell ID may be related to different CORESET pool indexes.

The first physical cell ID may be based on a physical cell identity (PCI) of the serving cell. The second physical cell ID may be based on an additional PCI.

The first physical cell ID may be related to a first timing advance group (TAG). The second physical cell ID may be related to a second TAG.

The method may further comprise an SSB configuration reception step related to the additional PCI. In the step, the UE receives, from the base station, a configuration for a synchronization signal block (SSB) related to the additional PCI. The step may be performed before the step S410.

For example, the configuration may include information on a measurement timing configuration (MTC) of the SSB related to the additional PCI. The MTC may be related to a timing occasion of the SSB. The configuration may be based on SSB-MTC-AdditionalPCI. The SSB may include additional SSBs that are not used for serving cell quality derivation. The additional SSBs may be related to different PCIs from a PCI of the serving cell. That is, the additional PCI may be a PCI of the additional SSB different from the PCI of the serving cell.

For example, the additional PCI may be indicated based on the PDCCH order. Specifically, a PCI related to PRACH transmission may be indicated based on the PDCCH order. The indicated PCI may be the PCI of the serving cell or the additional PCI. For example, DCI related to the PDCCH order may include a field (e.g., PRACH association indicator field) indicating the PCI related to the PRACH transmission.

The method may further comprise a RACH configuration reception step. In the step, the UE receives, from the base station, a random access channel (RACH) configuration related to the additional PCI. The step may be performed before the step S410. For example, the RACH configuration may include random access parameters for the additional PCI. The RACH configuration may be based on RACH-ConfigTwoTA.

Operations based on the SSB configuration reception step related to the additional PCI, the RACH configuration reception step, and the steps S410 to S440 may be implemented by a device of FIG. 6. For example, a UE 200 may control one or more transceivers 230 and/or one or more memories 240 so as to perform the operations based on the SSB configuration reception step related to the additional PCI, the RACH configuration reception step, and the steps S410 to S440.

Below, the above-described embodiments are described in detail from a BS operation perspective.

Operations based on an SSB configuration transmission step related to an additional PCI, a RACH configuration transmission step, and steps S510 to S540 described below correspond to the operations based on the SSB configuration reception step related to the additional PCI, the RACH configuration reception step, and the steps S410 to S440 described with reference to FIG. 4. Considering the above correspondence, redundant description is omitted. That is, a detailed description of the BS operation described below can be replaced with the description/embodiment of FIG. 4 corresponding to the BS operation.

Figure 5:
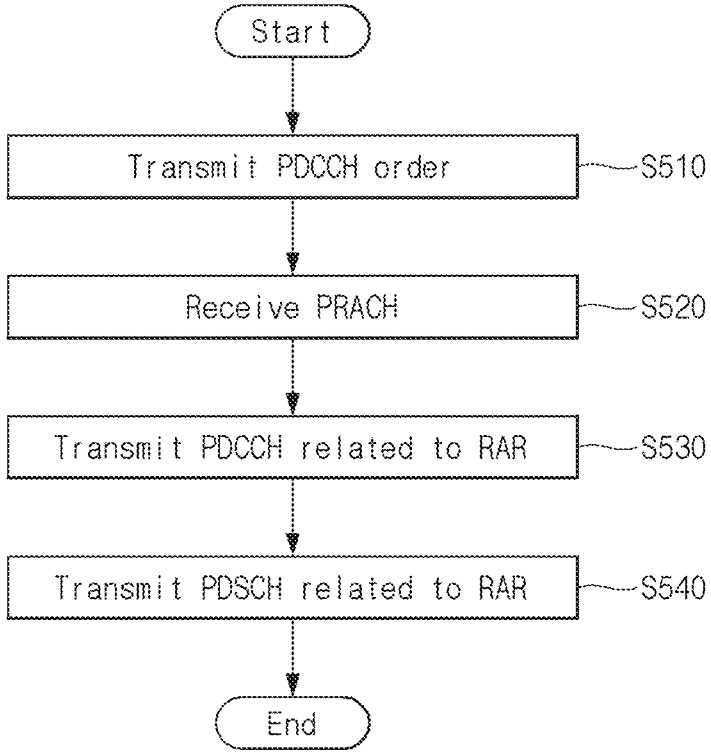
FIG. 5 is a flow chart illustrating a method performed by a base station according to another embodiment of the present disclosure.

FIG. 5 is a flow chart illustrating a method performed by a base station according to another embodiment of the present disclosure.

Referring to FIG. 5, a method performed by a base station (BS) according to another embodiment of the present disclosure may comprise a PDCCH order transmission step S510, a PRACH reception step S520, a PDCCH transmission step S530 related to RAR, and a PDSCH transmission step S540 related to RAR.

In the step S510, the base station transmits, to a UE, a physical downlink control channel (PDCCH) order related to an initiation of a random access procedure.

In the step S520, the base station receives a physical random access channel (PRACH) from the UE.

In the step S530, the base station transmits, to the UE, a physical downlink control channel (PDCCH) related to a random access response (RAR).

In the step S540, the base station transmits, to the UE, a physical downlink shared channel (PDSCH) related to the RAR.

The method may further comprise an SSB configuration transmission step related to additional PCI. In the step, the base station transmits, to the UE, a configuration for a synchronization signal block (SSB) related to the additional PCI. The step may be performed before the step S510.

The method may further comprise a RACH configuration transmission step. In the step, the base station transmits, to the UE, a random access channel (RACH) configuration related to the additional PCI. The step may be performed before the step S510.

Operations based on the SSB configuration transmission step related to the additional PCI, the RACH configuration transmission step, and the steps S510 to S540 may be implemented by a device of FIG. 6. For example, a base station 100 may control one or more transceivers 130 and/or one or more memories 140 so as to perform the operations based on the SSB configuration transmission step related to the additional PCI, the RACH configuration transmission step, and the steps S510 to S540.

The operations/terms based on the above-described embodiments have been described assuming the 5G system. However, this is merely for convenience of explanation and is not intended to limit the scope of application of the technical problem and the problem solution to be solved by the present disclosure to a specific system. That is, the technical challenges/technical issues/problems mentioned in the present disclosure may equally exist in other systems (e.g., 6G system). It is obvious that embodiments of the present disclosure can be extended and applied to solve the same problems in the other systems. Therefore, for expanded application of embodiments of the present disclosure to other systems, terms defined/described based on the 5G system can be replaced/changed with terms defined in the other systems (or generalized terms not specific to one system).

For example, the PRACH may be replaced with a first uplink channel.

For example, the RAR may be replaced with a response related to the first uplink channel.

For example, the PDCCH and the PDSCH may be replaced with a first downlink channel and a second downlink channel.

For example, the DCI may be replaced with control information.

For example, 'quasi co-location (QCL) properties for the reception of the PDCCH and the PDSCH' may be replaced with 'properties, configurations, or parameters for receiving the first downlink channel and the second downlink channel.'

A device to which an embodiment of the present disclosure is applicable (a device implementing the method/operation according to an embodiment of the present disclosure) is described below with reference to FIG. 6.

FIG. 6 illustrates configuration of a first device and a second device according to an embodiment of the present disclosure.

A first device 100 may include a processor 110, an antenna unit 120, a transceiver 130, and a memory 140.

The processor 110 may perform baseband-related signal processing and include a higher layer processing unit 111 and a physical layer processing unit 115. The higher layer processing unit 111 may process operations of the MAC layer, the RRC layer, or higher layers. The physical layer processing unit 115 may process the operation of the PHY layer. For example, if the first device 100 is a base station (BS) device in BS-UE communication, the physical layer processing unit 115 may perform uplink reception signal processing, downlink transmission signal processing, and the like. For example, if the first device 100 is a first UE device in inter-UE communication, the physical layer processing unit 115 may performs downlink reception signal processing, uplink transmission signal processing, sidelink transmission signal processing, and the like. The processor 110 may control the overall operation of the first device 100 in addition to performing the baseband-related signal processing.

The antenna unit 120 may include one or more physical antennas and support MIMO transmission/reception if the antenna unit 120 includes a plurality of antennas. The transceiver 130 may include a radio frequency (RF) transmitter and an RF receiver. The memory 140 may store information processed by the processor 110 and software, operating systems, and applications related to the operation of the first device 100. The memory 140 may also include components such as a buffer.

The processor 110 of the first device 100 may be configured to implement the operation of the BS in the BS-UE communication (or the operation of the first UE device in the inter-UE communication) in embodiments described in the present disclosure.

The second device 200 may include a processor 210, an antenna unit 220, a transceiver 230, and a memory 240.

The processor 210 may perform baseband-related signal processing and include a higher layer processing unit 211 and a physical layer processing unit 215. The higher layer processing unit 211 may process the operation of the MAC layer, the RRC layer, or higher layers. The physical layer processing unit 215 may process the operation of the PHY layer. For example, if the second device 200 is a UE device in BS-UE communication, the physical layer processing unit 215 may perform downlink reception signal processing, uplink transmission signal processing, and the like. For example, if the second device 200 is a second UE device in inter-UE communication, the physical layer processing unit 215 may perform downlink reception signal processing, uplink transmission signal processing, sidelink reception signal processing, and the like. The processor 210 may control the overall operation of the second device 210 in addition to performing the baseband-related signal processing.

The antenna unit 220 may include one or more physical antennas and support MIMO transmission/reception if the antenna unit 220 includes a plurality of antennas. The transceiver 230 may include an RF transmitter and an RF receiver. The memory 240 may store information processed by the processor 210 and software, operating systems, and applications related to the operation of the second device 200. The memory 240 may also include components such as a buffer.

The processor 210 of the second device 200 may be configured to implement the operation of the UE in the BS-UE communication (or the operation of the second UE device in the inter-UE communication) in embodiments described in the present disclosure.

The descriptions for the BS and the UE in the BS-UE communication (or the first UE device and the second UE device in the inter-UE communication) in the examples of the present disclosure can be equally applied to the operations of the first device 100 and the second device 200, and redundant descriptions are omitted.

The wireless communication technology implemented in the devices 100 and 200 according to the present disclosure may further include narrowband Internet of Things (NB-IoT) for low-power communication in addition to LTE, NR, and 6G. For example, the NB-IoT technology may be an example of a low power wide area network (LPWAN) technology and may be implemented in standards such as LTE Cat NB1 and/or LTE Cat NB2. The NB-IoT technology is not limited to the above-described names.

Additionally or alternatively, the wireless communication technology implemented in the devices 100 and 200 according to the present disclosure may perform communication based on LTE-M technology. For example, the LTE-M technology may be an example of the LPWAN technology, and may be called by various names such as enhanced machine type communication (eMTC). For example, the LTE-M technology may be implemented with at least one of various standards such as 1) LTE CAT 0, 2) LTE Cat M1, 3) LTE Cat M2, 4) LTE non-BL (non-Bandwidth Limited), 5) LTE-MTC, 6) LTE machine type communication, and/or 7) LTE M. The LTE-M technology is not limited to the above-mentioned names.

Additionally or alternatively, the wireless communication technology implemented in the devices 100 and 200 according to the present disclosure may include at least one of ZigBee, Bluetooth, and low power wide area network (LPWAN) in consideration of low power communication, and is not limited to the above-mentioned names. For example, the ZigBee technology may create personal area networks (PAN) related to small/low-power digital communication based on various standards such as IEEE 802.15.4, and may be called by various names.

The invention claimed is:

1. A method performed by a user equipment (UE) comprising:

receiving a Physical Downlink Control CHannel (PDCCH) order related to an initiation of a random access procedure;

transmitting a Physical Random Access Channel (PRACH);

receiving a Physical Downlink Control CHannel (PDCCH) related to a Random Access Response (RAR); and receiving a Physical Downlink Shared CHannel (PDSCH) related to the RAR, wherein, based on a COntrol REsource SET (CORESET) related to the PDCCH order being related to a second physical cell ID different from a first physical cell ID: Quasi Co-Location (QCL) properties for the PDCCH and the PDSCH are based on a CORESET related to a Type 1-PDCCH Common Search Space (CSS) set, wherein DeModulation Reference Signal (DMRS) ports related to the PDSCH are quasi co-located with a DMRS port associated with PDCCH receptions in the CORESET related to the Type 1-PDCCH CSS set, with respect to the QCL properties.

2. The method of claim 1, wherein the QCL properties include at least one of a Doppler shift, a Doppler spread, an average delay, a delay spread and/or a spatial Rx parameter.

3. The method of claim 1, wherein the first physical cell ID and the second physical cell ID are related to different CORESET pool indices.

4. The method of claim 3, wherein the first physical cell ID is based on a Physical Cell Identity (PCI) of a serving cell, and the second physical cell ID is based on an additional PCI.

5. The method of claim 4, further comprising: receiving a configuration for a Synchronization Signal Block (SSB) related to the additional PCI.

6. The method of claim 5, wherein the additional PCI is indicated based on the PDCCH order.

7. The method of claim 4, further comprising: receiving a Random Access CHannel (RACH) configuration related to the additional PCI.

8. The method of claim 4, wherein the Type 1-PDCCH CSS set is related to the serving cell.

9. The method of claim 3, wherein the first physical cell ID is related to a first Timing Advance Group (TAG), and the second physical cell ID is related to a second TAG.

10. The method of claim 1, wherein the random access procedure is related to a Special Cell (SpCell) in which two Timing Advance Groups (TAGs) are configured.

11. A user equipment (UE) comprising:

one or more transceivers;

one or more processors; and one or more memories that are connected to the one or more processors and store instructions, wherein the instructions, based on being executed by the one or more processors, configure the one or more processors to perform operations comprising:

receiving a Physical Downlink Control Channel (PDCCH) order related to an initiation of a random access procedure;

transmitting a Physical Random Access Channel (PRACH);

receiving a Physical Downlink Control Channel (PDCCH) related to Random Access Response (RAR); and receiving a Physical Downlink Shared Channel (PDSCH) related to the RAR, wherein, based on a Control Resource SET (CORESET) related to the PDCCH order being related to a second physical cell ID different from a first physical cell ID: Quasi Co-Location (QCL) properties for the PDCCH and the PDSCH are based on a CORESET related to a Type 1-PDCCH Common Search Space (CSS) set, wherein DeModulation Reference Signal (DMRS) ports related to the PDSCH are quasi co-located with a DMRS port associated with PDCCH receptions in the CORESET related to the Type 1-PDCCH CSS set, with respect to the QCL properties.

12. A base station comprising:

one or more transceivers;

one or more processors; and one or more memories that are connected to the one or more processors and store instructions, wherein the instructions, based on being executed by the one or more processors, configure the one or more processors to perform operations comprising:

transmitting a Physical Downlink Control CHannel (PDCCH) order related to an initiation of a random access procedure;

receiving a Physical Random Access Channel (PRACH);

transmitting a Physical Downlink Control CHannel (PDCCH) related to a Random Access Response (RAR); and transmitting a Physical Downlink Shared CHannel (PDSCH) related to the RAR, wherein, based on a COntrol REsource SET (CORESET) related to the PDCCH order being related to a second physical cell ID different from a first physical cell ID: Quasi Co-Location (QCL) properties for the PDCCH and the PDSCH, are based on a CORESET related to a Type 1-PDCCH Common Search Space (CSS) set, Wherein DeModulation Reference Signal (DMRS) ports related to the PDSCH are quasi co-loated with a DMRS port associated with PDCCH receptions in the CORESET related to the Type 1-PDCCH CSS set, with respect to the QCL properties.

* * * * *